US012770055B2

(12) United States Patent
Marzban et al.

(10) Patent No.: US 12,770,055 B2
(45) Date of Patent: Oct. 20, 2026

(54) SCHEMES FOR IDENTIFYING CORRUPTED DATASETS FOR MACHINE LEARNING SECURITY

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1099 days.

(21) Appl. No.: 17/890,542

(22) Filed: Aug. 18, 2022

(65) Prior Publication Data

US 2024/0064516 A1 Feb. 22, 2024

(51) Int. Cl.
*G06N 20/00* (2019.01)
*G06F 18/21* (2023.01)

(52) U.S. Cl.
CPC ........... *G06N 20/00* (2019.01); *G06F 18/217* (2023.01)

(58) Field of Classification Search
CPC ............ G06N 20/00; G06N 3/09; G06N 3/08; G06N 3/045; G06N 3/00; G06N 5/00; G06N 7/00; G06F 18/217; G06F 17/40; G06F 17/00; H04W 24/10; H04W 24/00; H04W 24/02; H04W 48/08; H04W 48/16; H04W 72/542; H04W 16/22; H04L 1/00
See application file for complete search history.

(56) References Cited

U.S. PATENT DOCUMENTS 10,867,245 B1 * 12/2020 Farhady Ghalaty ..... G06N 3/09
11,689,566 B2 * 6/2023 Baracaldo-Angel .......................... G06F 18/2113 706/12
11,783,031 B1 * 10/2023 Han ........................ G06N 3/098 726/23
12,164,503 B1 * 12/2024 Khan .................. G06F 21/1014
12,306,907 B2 * 5/2025 Haile ..................... G06F 18/214
12,481,793 B2 * 11/2025 Ezrielev .................. G06F 21/64
12,524,707 B2 * 1/2026 Elisha ..................... G06N 20/00
2019/0251479 A1 * 8/2019 Anderson ........... H04L 63/1466
2019/0319868 A1 * 10/2019 Svennebring ......... H04W 24/08
2020/0082270 A1 * 3/2020 Gu ......................... G06F 21/606
2021/0056412 A1 * 2/2021 Jung ..................... G06N 3/0464
2021/0303923 A1 * 9/2021 Lee ......................... G06V 10/82
(Continued)

*Primary Examiner* — Yuwen Pan
*Assistant Examiner* — Samuel H. Leonard
(74) *Attorney, Agent, or Firm* — Holland & Hart LLP

(57) ABSTRACT

Methods, systems, and devices for wireless communications are described. A network entity may obtain a first dataset for a predictive model and may determine a validity of the first dataset based on a legitimacy test of the first dataset. A legitimacy test may include comparing a first output of a predictive model associated with the first dataset to a second output of the predictive model associated with at least one second dataset, where a result of the legitimacy test may be based on a performance metric associated with the comparing and may indicate whether the first dataset is valid or corrupted. The network entity may perform the legitimacy test and may transmit information associated with a result of the legitimacy test to one or more other network entities. In some cases, the network entity may receive a request to perform the legitimacy test.

30 Claims, 13 Drawing Sheets

400

(56) References Cited

U.S. PATENT DOCUMENTS

| | | | | |
|---|---|---|---|---|
| 2022/0053345 | A1* | 2/2022 | Albert | H04B 17/373 |
| 2022/0101182 | A1* | 3/2022 | Patel | G06N 20/00 |
| 2022/0335021 | A1* | 10/2022 | Reddy | G06F 16/2365 |
| 2022/0343109 | A1* | 10/2022 | Haile | G06N 7/01 |
| 2023/0274003 | A1* | 8/2023 | Liu | G06N 3/094 726/26 |
| 2023/0419130 | A1* | 12/2023 | Saxena | G06N 5/027 |
| 2024/0048988 | A1* | 2/2024 | Pravinchandra Bhatt | H04L 63/1441 |
| 2024/0121161 | A1* | 4/2024 | Chen | G06N 3/045 |

* cited by examiner

SCHEMES FOR IDENTIFYING CORRUPTED DATASETS FOR MACHINE LEARNING SECURITY

FIELD OF TECHNOLOGY

The following relates to wireless communications, including schemes for identifying corrupted datasets for machine learning security.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some devices in a wireless communications system may implement machine learning techniques. For example, a network entity may utilize a machine learning model that is based on a data-driven algorithm (e.g., a machine learning algorithm). UEs may perform measurements and communicate data based on the measurements to the network entity, and the network entity may use the data to train and test the machine learning model.

SUMMARY

The described techniques relate to improved methods, systems, devices, and apparatuses that support schemes for identifying corrupted datasets for machine learning security. For example, the described techniques enable network entities to exchange information related to legitimacy or illegitimacy (e.g., corruption) of datasets in order to avoid using corrupted datasets in machine learning operations. A network entity may test a candidate dataset using a legitimacy test, which may be an example of a machine learning model (also referred to as a machine learning algorithm or a predictive model). The legitimacy test may include testing or training the machine learning model with the candidate dataset and analyzing an output of the machine learning model. For example, the network entity may compare the output to an output of the machine learning model that is trained or tested on a different dataset, such as a trusted dataset. If the candidate dataset has a negative performance impact on the machine learning model (e.g., if the output associated with the candidate dataset corresponds to a performance degradation compared to the output associated with the trusted dataset), the network entity may determine that the candidate dataset is corrupted (i.e., invalid or illegitimate). In some cases, the network entity may determine one or more performance metrics indicative of the candidate dataset's performance impact on the output of the machine learning model.

The network entity may share information about the candidate dataset to other network entities, such as information relating to a result of the legitimacy test of the candidate dataset. For example, the network entity may indicate that the candidate dataset is corrupt (e.g., failed the legitimacy test) and is not recommended for use in a machine learning model or is legitimate (e.g., passed the legitimacy test) and may be used in a machine learning model. Additionally, or alternatively, the network entity may indicate the one or more performance metrics, a testing scheme used for the legitimacy test, or the like, among other examples. In some cases, the network entity may share the candidate dataset based on the result of the legitimacy test.

In some examples, the network entity may receive the candidate dataset from a UE based on measurements performed at the UE. In other examples, the network entity may receive the candidate dataset from another network entity and may perform the legitimacy test for and share associated information with the other network entity. Additionally, or alternatively, the network entity may receive (e.g., from another network entity, a core network node, or the like) a request to perform the legitimacy test for or to share legitimacy information associated with the candidate dataset. In some cases, the network entity may receive a configuration (e.g., one or more parameters) for the legitimacy test, for instance, from a core network node. The network entity may perform the legitimacy test in accordance with the configuration.

A method for wireless communications at a first network entity is described. The method may include receiving a first dataset for a predictive model, the first dataset corresponding to one or more measurements associated with a UE, transmitting, to a second network entity, the first dataset for a legitimacy test of the first dataset, the legitimacy test to determine a validity of the first dataset based on at least one second dataset, receiving, from the second network entity, a message including information associated with a result of the legitimacy test of the first dataset, and updating the predictive model using one or more datasets based on the information, where the one or more datasets include the first dataset or exclude the first dataset based on the result of the legitimacy test.

An apparatus for wireless communications at a first network entity is described. The apparatus may include a processor, memory coupled with the processor, and instructions stored in the memory. The instructions may be executable by the processor to cause the apparatus to receive a first dataset for a predictive model, the first dataset corresponding to one or more measurements associated with a UE, transmit, to a second network entity, the first dataset for a legitimacy test of the first dataset, the legitimacy test to determine a validity of the first dataset based on at least one second dataset, receive, from the second network entity, a message including information associated with a result of the legitimacy test of the first dataset, and update the predictive model using one or more datasets based on the information, where the one or more datasets include the first dataset or exclude the first dataset based on the result of the legitimacy test.

Another apparatus for wireless communications at a first network entity is described. The apparatus may include means for receiving a first dataset for a predictive model, the first dataset corresponding to one or more measurements associated with a UE, means for transmitting, to a second network entity, the first dataset for a legitimacy test of the first dataset, the legitimacy test to determine a validity of the first dataset based on at least one second dataset, means for receiving, from the second network entity, a message including information associated with a result of the legitimacy test of the first dataset, and means for updating the predictive model using one or more datasets based on the information, where the one or more datasets include the first dataset or exclude the first dataset based on the result of the legitimacy test.

A non-transitory computer-readable medium storing code for wireless communications at a first network entity is described. The code may include instructions executable by a processor to receive a first dataset for a predictive model, the first dataset corresponding to one or more measurements associated with a UE, transmit, to a second network entity, the first dataset for a legitimacy test of the first dataset, the legitimacy test to determine a validity of the first dataset based on at least one second dataset, receive, from the second network entity, a message including information associated with a result of the legitimacy test of the first dataset, and update the predictive model using one or more datasets based on the information, where the one or more datasets include the first dataset or exclude the first dataset based on the result of the legitimacy test.

In some examples of the method, apparatuses, and non-transitory computer-readable medium described herein, receiving the message may include operations, features, means, or instructions for receiving, as part of the message, an indication that the first dataset may be to be included in the one or more datasets based on a success result of the legitimacy test of the first dataset, where the success result of the legitimacy test corresponds to the validity of the first dataset being valid.

In some examples of the method, apparatuses, and non-transitory computer-readable medium described herein, receiving the message may include operations, features, means, or instructions for receiving, as part of the message, an indication that the first dataset may be to be excluded from the one or more datasets based on a failure result of the legitimacy test of the first dataset, where the failure result of the legitimacy test corresponds to the validity of the first dataset being corrupt.

In some examples of the method, apparatuses, and non-transitory computer-readable medium described herein, receiving the message may include operations, features, means, or instructions for receiving, as part of the message, one or more performance metrics associated with the first dataset based on the legitimacy test.

In some examples of the method, apparatuses, and non-transitory computer-readable medium described herein, the one or more performance metrics include a performance relation metric associated with the first dataset and the at least one second dataset, a performance difference associated with the first dataset and the at least one second dataset, or a combination thereof.

In some examples of the method, apparatuses, and non-transitory computer-readable medium described herein, the one or more performance metrics may be associated with a negative impact on an output of the legitimacy test.

In some examples of the method, apparatuses, and non-transitory computer-readable medium described herein, receiving the message may include operations, features, means, or instructions for receiving, as part of the message, an indication that the result of the legitimacy test may be based on a performance metric associated with the second predictive model using the first dataset and the at least one second dataset.

In some examples of the method, apparatuses, and non-transitory computer-readable medium described herein, the message further indicates that the second predictive model may be trained on the at least one second dataset and indicates that the first dataset may be used as test data for the second predictive model.

In some examples of the method, apparatuses, and non-transitory computer-readable medium described herein, the at least one second dataset includes a trusted dataset.

In some examples of the method, apparatuses, and non-transitory computer-readable medium described herein, the message further indicates that the first dataset may be used as an input dataset to train the second predictive model and indicates that the at least one second dataset may be used as test data for the second predictive model.

In some examples of the method, apparatuses, and non-transitory computer-readable medium described herein, the at least one second dataset includes a trusted dataset.

In some examples of the method, apparatuses, and non-transitory computer-readable medium described herein, the message further indicates that the second predictive model may be trained on a first set of datasets and indicates that a second set of datasets may be used as test data for the second predictive model.

In some examples of the method, apparatuses, and non-transitory computer-readable medium described herein, the first set of datasets, the second set of datasets, or both includes the first dataset.

Some examples of the method, apparatuses, and non-transitory computer-readable medium described herein may further include operations, features, means, or instructions for transmitting, to the second network entity, a second message indicating a request for the second network entity to perform the legitimacy test of the first dataset, where receiving the message may be based on the request.

Some examples of the method, apparatuses, and non-transitory computer-readable medium described herein may further include operations, features, means, or instructions for transmitting a second message indicating a request for datasets associated with one or more performance metrics that satisfy a performance threshold, receiving a third message including a dataset based on the request, and updating the predictive model using the dataset.

A method for wireless communications at a second network entity is described. The method may include receiving, from a first network entity, a first dataset for a predictive model at the first network entity, the first dataset corresponding to one or more measurements associated with a UE, performing a legitimacy test of the first dataset based on the first dataset and at least one second dataset, the legitimacy test to determine a validity of the first dataset, and transmitting, to the first network entity, a message including information associated with a result of the legitimacy test of the first dataset.

An apparatus for wireless communications at a second network entity is described. The apparatus may include a processor, memory coupled with the processor, and instructions stored in the memory. The instructions may be executable by the processor to cause the apparatus to receive, from a first network entity, a first dataset for a predictive model at the first network entity, the first dataset corresponding to one or more measurements associated with a UE, perform a legitimacy test of the first dataset based on the first dataset and at least one second dataset, the legitimacy test to determine a validity of the first dataset, and transmit, to the first network entity, a message including information associated with a result of the legitimacy test of the first dataset.

Another apparatus for wireless communications at a second network entity is described. The apparatus may include means for receiving, from a first network entity, a first dataset for a predictive model at the first network entity, the first dataset corresponding to one or more measurements associated with a UE, means for performing a legitimacy test of the first dataset based on the first dataset and at least one second dataset, the legitimacy test to determine a validity of the first dataset, and means for transmitting, to the first network entity, a message including information associated with a result of the legitimacy test of the first dataset.

A non-transitory computer-readable medium storing code for wireless communications at a second network entity is described. The code may include instructions executable by a processor to receive, from a first network entity, a first dataset for a predictive model at the first network entity, the first dataset corresponding to one or more measurements associated with a UE, perform a legitimacy test of the first dataset based on the first dataset and at least one second dataset, the legitimacy test to determine a validity of the first dataset, and transmit, to the first network entity, a message including information associated with a result of the legitimacy test of the first dataset.

In some examples of the method, apparatuses, and non-transitory computer-readable medium described herein, performing the legitimacy test may include operations, features, means, or instructions for comparing a first output of the second predictive model associated with the first dataset against a second output of the second predictive model associated with the second dataset to obtain a performance metric, where the result of the legitimacy test may be based on the performance metric.

In some examples of the method, apparatuses, and non-transitory computer-readable medium described herein, a success result of the legitimacy test corresponds to the validity of the first dataset being valid based on the performance metric satisfying a performance threshold and a failure result of the legitimacy test corresponds to the validity of the first dataset being corrupt based on the performance metric failing to satisfy the performance threshold.

Some examples of the method, apparatuses, and non-transitory computer-readable medium described herein may further include operations, features, means, or instructions for receiving a second message indicating a request for datasets associated with one or more performance metrics that satisfy a performance threshold, determining that the performance metric satisfies the performance threshold, and transmitting a third message including the first dataset based on the request.

Some examples of the method, apparatuses, and non-transitory computer-readable medium described herein may further include operations, features, means, or instructions for determining a distribution metric associated with the first dataset and the at least one second dataset, where comparing the first output against the second output may be based on the distribution metric satisfying a similarity threshold.

In some examples of the method, apparatuses, and non-transitory computer-readable medium described herein, transmitting the message may include operations, features, means, or instructions for transmitting, as part of the message, an indication that the first dataset may be to be included in one or more datasets for the predictive model based on a success result of the legitimacy test of the first dataset.

In some examples of the method, apparatuses, and non-transitory computer-readable medium described herein, transmitting the message may include operations, features, means, or instructions for transmitting, as part of the message, an indication that the first dataset may be to be excluded from one or more datasets for the predictive model based on a failure result of the legitimacy test of the first dataset.

In some examples of the method, apparatuses, and non-transitory computer-readable medium described herein, transmitting the message may include operations, features, means, or instructions for transmitting, as part of the message, one or more performance metrics associated with the first dataset based on the legitimacy test.

In some examples of the method, apparatuses, and non-transitory computer-readable medium described herein, the one or more performance metrics include a performance relation metric associated with the first dataset and the at least one second dataset, a performance difference associated with the first dataset and the at least one second dataset, or a combination thereof.

In some examples of the method, apparatuses, and non-transitory computer-readable medium described herein, the one or more performance metrics may be associated with a negative impact on an output of the legitimacy test.

In some examples of the method, apparatuses, and non-transitory computer-readable medium described herein, transmitting the message may include operations, features, means, or instructions for transmitting, as part of the message, an indication that the result of the legitimacy test may be based on a performance metric associated with the second predictive model using the first dataset and the at least one second dataset.

In some examples of the method, apparatuses, and non-transitory computer-readable medium described herein, performing the legitimacy test may include operations, features, means, or instructions for providing the at least one second dataset as training inputs for the second predictive model to obtain a first output, providing the first dataset as testing inputs for the second predictive model to obtain a second output, and comparing the first output with the second output to obtain the performance metric, where the message further indicates that the second predictive model may be trained on the at least one second dataset and indicates that the first dataset may be used as test data for the second predictive model.

In some examples of the method, apparatuses, and non-transitory computer-readable medium described herein, the at least one second dataset includes a trusted dataset.

In some examples of the method, apparatuses, and non-transitory computer-readable medium described herein, performing the legitimacy test may include operations, features, means, or instructions for providing the first dataset as training inputs for the second predictive model to obtain a first output, providing the at least one second dataset as testing inputs for the second predictive model to obtain a second output, and comparing the first output with the second output to obtain the performance metric, where the message further indicates that the second predictive model may be trained on the first dataset and indicates that the at least one second dataset may be used as test data for the second predictive model.

In some examples of the method, apparatuses, and non-transitory computer-readable medium described herein, the at least one second dataset includes a trusted dataset.

In some examples of the method, apparatuses, and non-transitory computer-readable medium described herein, performing the legitimacy test may include operations, features, means, or instructions for providing a first set of datasets as training inputs for the second predictive model to obtain a first output, providing a second set of datasets as testing inputs for the second predictive model to obtain a second output, and comparing the first output with the second output to obtain the performance metric, where the message further indicates that the second predictive model may be trained on the first set of datasets and indicates that the second set of datasets may be used as test data for the second predictive model.

In some examples of the method, apparatuses, and non-transitory computer-readable medium described herein, the first set of datasets, the second set of datasets, or both includes the first dataset.

Some examples of the method, apparatuses, and non-transitory computer-readable medium described herein may further include operations, features, means, or instructions for receiving a second message indicating a third dataset and performing a legitimacy test of the third dataset based on the third dataset and the at least one second dataset, where the message further includes information associated with a result of the legitimacy test of the third dataset.

Some examples of the method, apparatuses, and non-transitory computer-readable medium described herein may further include operations, features, means, or instructions for receiving, from the first network entity, a second message indicating a request for the second network entity to perform the legitimacy test of the first dataset, where transmitting the message may be based on the request.

A method for wireless communications at a network entity is described. The method may include receiving, from a core network node, a message indicating one or more parameters for a legitimacy test for datasets associated with a predictive model, receiving a first dataset for the predictive model, the first dataset corresponding to one or more measurements associated with a UE, performing the legitimacy test of the first dataset based on the first dataset and at least one second dataset and in accordance with the one or more parameters the legitimacy test to determine a validity of the first dataset, and updating the predictive model using one or more datasets, where the one or more datasets include the first dataset or exclude the first dataset based on a result of the legitimacy test.

An apparatus for wireless communications at a network entity is described. The apparatus may include a processor, memory coupled with the processor, and instructions stored in the memory. The instructions may be executable by the processor to cause the apparatus to receive, from a core network node, a message indicating one or more parameters for a legitimacy test for datasets associated with a predictive model, receive a first dataset for the predictive model, the first dataset corresponding to one or more measurements associated with a UE, perform the legitimacy test of the first dataset based on the first dataset and at least one second dataset and in accordance with the one or more parameters the legitimacy test to determine a validity of the first dataset, and update the predictive model using one or more datasets, where the one or more datasets include the first dataset or exclude the first dataset based on a result of the legitimacy test.

Another apparatus for wireless communications at a network entity is described. The apparatus may include means for receiving, from a core network node, a message indicating one or more parameters for a legitimacy test for datasets associated with a predictive model, means for receiving a first dataset for the predictive model, the first dataset corresponding to one or more measurements associated with a UE, means for performing the legitimacy test of the first dataset based on the first dataset and at least one second dataset and in accordance with the one or more parameters the legitimacy test to determine a validity of the first dataset, and means for updating the predictive model using one or more datasets, where the one or more datasets include the first dataset or exclude the first dataset based on a result of the legitimacy test.

A non-transitory computer-readable medium storing code for wireless communications at a network entity is described. The code may include instructions executable by a processor to receive, from a core network node, a message indicating one or more parameters for a legitimacy test for datasets associated with a predictive model, receive a first dataset for the predictive model, the first dataset corresponding to one or more measurements associated with a UE, perform the legitimacy test of the first dataset based on the first dataset and at least one second dataset and in accordance with the one or more parameters the legitimacy test to determine a validity of the first dataset, and update the predictive model using one or more datasets, where the one or more datasets include the first dataset or exclude the first dataset based on a result of the legitimacy test.

In some examples of the method, apparatuses, and non-transitory computer-readable medium described herein, receiving the message may include operations, features, means, or instructions for receiving, as part of the message, a request for the network entity to perform the legitimacy test for the first dataset and transmitting a second message indicating the result of the legitimacy test of the first dataset based on the request.

In some examples of the method, apparatuses, and non-transitory computer-readable medium described herein, the one or more parameters include one or more distribution metrics associated with statistical properties of the first dataset and the at least one second dataset, one or more similarity thresholds corresponding to the one or more distribution metrics, or a combination thereof.

Some examples of the method, apparatuses, and non-transitory computer-readable medium described herein may further include operations, features, means, or instructions for determining a distribution metric of the one or more distribution metrics for the first dataset and the at least one second dataset, where performing the legitimacy test may be based on the distribution metric satisfying a similarity threshold of the one or more similarity thresholds.

Some examples of the method, apparatuses, and non-transitory computer-readable medium described herein may further include operations, features, means, or instructions for determining a distribution metric of the one or more distribution metrics for the first dataset and the at least one second dataset and refraining from performing the legitimacy test based on the distribution metric failing to satisfy a similarity threshold of the one or more similarity thresholds.

In some examples of the method, apparatuses, and non-transitory computer-readable medium described herein, performing the legitimacy test may include operations, features, means, or instructions for comparing a first output of the second predictive model associated with the first dataset against a second output of the second predictive model associated with the second dataset to obtain a performance metric, where the result of the legitimacy test may be based on the performance metric.

In some examples of the method, apparatuses, and non-transitory computer-readable medium described herein, a success result of the legitimacy test corresponds to the validity of the first dataset being valid based on the performance metric satisfying a performance threshold and a failure result of the legitimacy test corresponds to the validity of the first dataset being corrupt based on the performance metric failing to satisfy the performance threshold.

Some examples of the method, apparatuses, and non-transitory computer-readable medium described herein may further include operations, features, means, or instructions for receiving a second message indicating a request for datasets associated with one or more performance metrics that satisfy a performance threshold, determining that the performance metric satisfies the performance threshold, and transmitting a third message including the first dataset based on the request.

In some examples of the method, apparatuses, and non-transitory computer-readable medium described herein, the performance metric includes a performance relation metric associated with the first dataset and the at least one second dataset, a performance difference associated with the first dataset and the at least one second dataset, or a combination thereof.

In some examples of the method, apparatuses, and non-transitory computer-readable medium described herein, performing the legitimacy test may include operations, features, means, or instructions for providing the at least one second dataset as training inputs for the second predictive model to obtain a first output, providing the first dataset as testing inputs for the second predictive model to obtain a second output, and comparing the first output with the second output to obtain a performance metric, where the result of the legitimacy test may be based on the performance metric.

In some examples of the method, apparatuses, and non-transitory computer-readable medium described herein, performing the legitimacy test may include operations, features, means, or instructions for providing the first dataset as training inputs for the second predictive model to obtain a first output, providing the at least one second dataset as testing inputs for the second predictive model to obtain a second output, and comparing the first output with the second output to obtain a performance metric, where the result of the legitimacy test may be based on the performance metric.

In some examples of the method, apparatuses, and non-transitory computer-readable medium described herein, performing the legitimacy test may include operations, features, means, or instructions for providing a first set of datasets as training inputs for the second predictive model to obtain a first output, providing a second set of datasets as testing inputs for the second predictive model to obtain a second output, and comparing the first output with the second output to obtain a performance metric, where the result of the legitimacy test may be based on the performance metric.

In some examples of the method, apparatuses, and non-transitory computer-readable medium described herein, the first set of datasets, the second set of datasets, or both includes the first dataset.

In some examples of the method, apparatuses, and non-transitory computer-readable medium described herein, updating the predictive model may include operations, features, means, or instructions for updating the predictive model using the one or more datasets including the first dataset based on a successful result of the legitimacy test of the first dataset.

In some examples of the method, apparatuses, and non-transitory computer-readable medium described herein, updating the predictive model may include operations, features, means, or instructions for updating the predictive model using the one or more datasets excluding the first dataset based on a failure result of the legitimacy test of the first dataset.

In some examples of the method, apparatuses, and non-transitory computer-readable medium described herein, the at least one second dataset includes a trusted dataset.

Some examples of the method, apparatuses, and non-transitory computer-readable medium described herein may further include operations, features, means, or instructions for receiving a second message including a third set of data and an indication of a successful result of a legitimacy test for the third set of data and updating the predictive model using the one or more datasets including the third dataset based on the second message.

A method for wireless communications at a core network node is described. The method may include configuring one or more parameters of a legitimacy test for datasets associated with a predictive model, the legitimacy test to determine a validity of a dataset and transmitting, to a set of network entities, a message indicating the one or more parameters for the legitimacy test.

An apparatus for wireless communications at a core network node is described. The apparatus may include a processor, memory coupled with the processor, and instructions stored in the memory. The instructions may be executable by the processor to cause the apparatus to configure one or more parameters of a legitimacy test for datasets associated with a predictive model, the legitimacy test to determine a validity of a dataset and transmit, to a set of network entities, a message indicating the one or more parameters for the legitimacy test.

Another apparatus for wireless communications at a core network node is described. The apparatus may include means for configuring one or more parameters of a legitimacy test for datasets associated with a predictive model, the legitimacy test to determine a validity of a dataset and means for transmitting, to a set of network entities, a message indicating the one or more parameters for the legitimacy test.

A non-transitory computer-readable medium storing code for wireless communications at a core network node is described. The code may include instructions executable by a processor to configure one or more parameters of a legitimacy test for datasets associated with a predictive model, the legitimacy test to determine a validity of a dataset and transmit, to a set of network entities, a message indicating the one or more parameters for the legitimacy test.

In some examples of the method, apparatuses, and non-transitory computer-readable medium described herein, a success result of the legitimacy test corresponds to a validity of the dataset being valid and a failure result of the legitimacy test corresponds to a validity of the dataset being corrupt.

Some examples of the method, apparatuses, and non-transitory computer-readable medium described herein may further include operations, features, means, or instructions for transmitting, to the set of network entities, a second message indicating a request to perform the legitimacy test on one or more datasets associated with the set of network entities in accordance with the one or more parameters.

Some examples of the method, apparatuses, and non-transitory computer-readable medium described herein may further include operations, features, means, or instructions for receiving, from the set of network entities, a set of messages indicating a result of the legitimacy test on one or more datasets associated with the set of network entities based on the one or more parameters.

In some examples of the method, apparatuses, and non-transitory computer-readable medium described herein, the one or more parameters include one or more distribution metrics associated with statistical properties of a first dataset and a second dataset, one or more similarity thresholds corresponding to the one or more distribution metrics, or a combination thereof.

DETAILED DESCRIPTION

Figure 1:
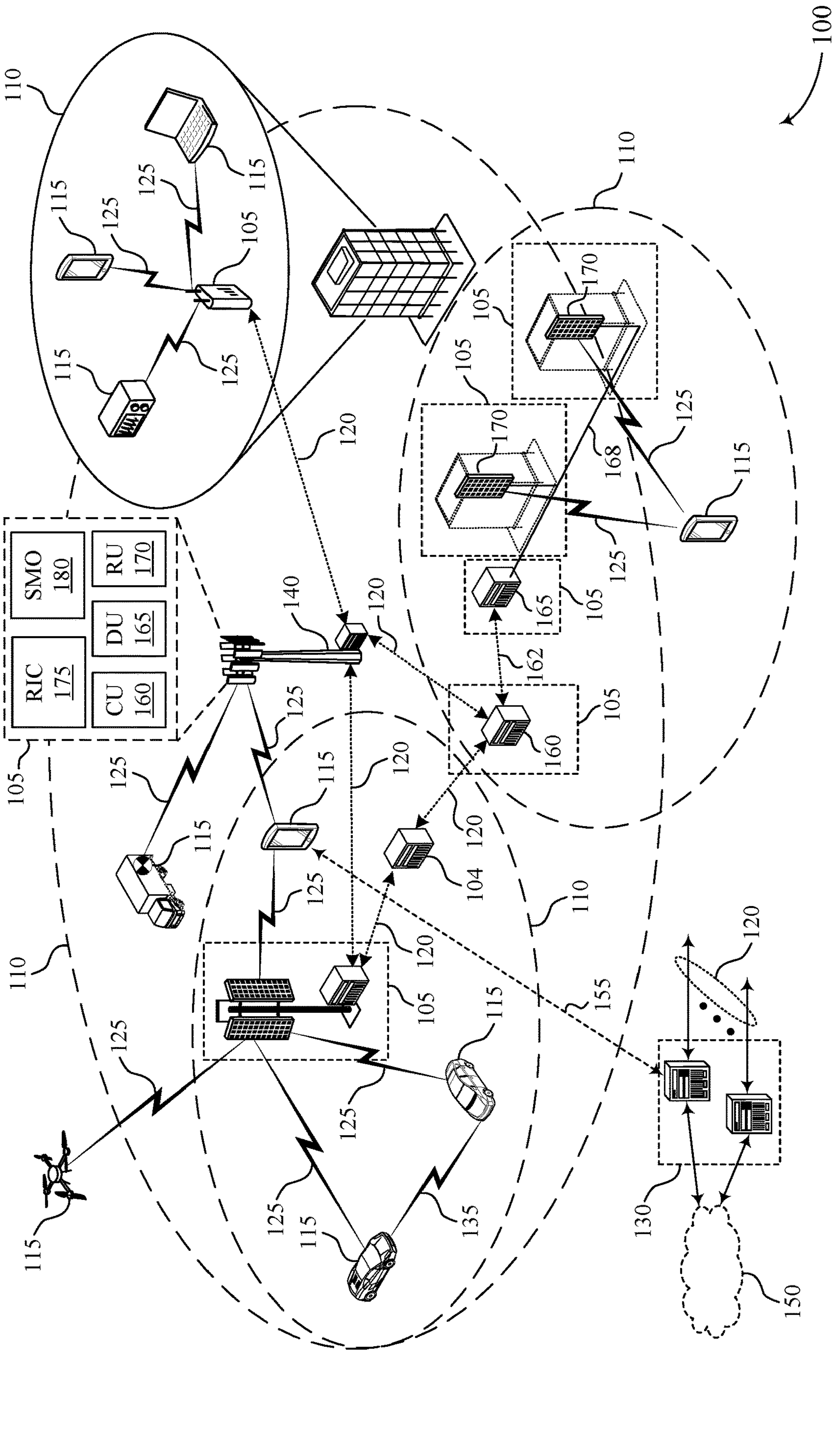
FIG. 1 illustrates an example of a wireless communications system that supports schemes for identifying corrupted datasets for machine learning security in accordance with one or more aspects of the present disclosure.

Devices in a wireless communications system may implement machine learning techniques in various operations. For example, a network entity may utilize a data-based algorithm (e.g., a machine learning algorithm) of a predictive model (e.g., a machine learning model) to make decisions or predictions. Training the predictive model may involve providing the algorithm with training data (e.g., a dataset for training). The algorithm may "learn" by finding patterns in the training data that map input data attributes to a target output. For example, the algorithm may create a mathematical representation of a relationship between features of the training data and one or more target outputs. A predictive model may refer to or be an example of a trained algorithm that predicts (e.g., infers) outputs based on input data. Performance of a predictive model may be evaluated based on the predictive model's ability to accurately predict an expected outcome. A predictive model that is trained on diverse datasets may provide relatively improved reliability, accuracy, and robustness.

The network entity may utilize different predictive models for different objectives. For example, the network entity may use a first predictive model to determine handover parameters and operations associated with a cell of the network entity, and may use a second predictive model to predict a most suitable beam for a beam selection process. The network entity may collect input data for use in a predictive model from one or more user equipment (UEs), other network nodes, or by performing measurements at the network entity. The collected input data may be used by the network entity to train, test, or run the predictive model. Due to the training process, a predictive model may inherently be sensitive to changes in input data. Thus, as data is collected or generated over time, the network entity may continuously update (e.g., train) the predictive model to ensure and maintain accuracy and performance. However, this sensitivity may also mean that predictive models are vulnerable to security threats, such as attacks from adversarial UEs.

In a poisoning attack, an adversarial UE may introduce perturbed (e.g., invalid or corrupted) data into a data pool, such as a training dataset. The perturbed data, when used to train or update a predictive model, may affect performance of the predictive model. For example, the predictive model may be trained to determine outputs that deviate from intended or desired outputs, e.g., the perturbed data may introduce error into the predictive model, which may degrade or negatively impact the predictive model's performance and reliability. In another example, the adversarial UE may aim to induce a specific outcome or prediction from the predictive model. To protect a predictive model from such risks, the network entity may identify and reject (e.g., discard) perturbed datasets (e.g., datasets including perturbed data). In some examples, the network entity may reject a dataset if the dataset corresponds to a negative impact on the performance of the predictive model.

According to the techniques described herein, network entities may share information related to legitimacy and performance of datasets to support robust and secure predictive models. A network entity may perform a legitimacy test of a candidate dataset to determine whether the candidate dataset is legitimate (e.g., valid) or perturbed (e.g., corrupted or invalid). The legitimacy test may involve comparing performance of the predictive model when the candidate dataset is used as input data (e.g., training data, testing data) to performance of the predictive model when the candidate set is not used. If the candidate dataset supports sufficient performance (e.g., passes the legitimacy test), the network entity may determine that the candidate dataset is suitable for use in a predictive model. In contrast, if the candidate dataset negatively impacts the performance (e.g., fails the legitimacy test), the network entity may determine that the candidate dataset is corrupt and should not be used for the predictive model.

The network entity may transmit a message indicating a result of the legitimacy test (e.g., a failure result, a success result) to one or more other devices in the wireless communications system. Additionally, or alternatively, the network entity may indicate (e.g., in the message) one or more performance metrics associated with the candidate dataset, a testing scheme used in the legitimacy test, or the like, among other examples. In some examples (e.g., if the candidate dataset successfully passes the legitimacy test), the network entity may also transmit the candidate dataset such that a receiving device (e.g., a receiving network entity) may utilize the candidate dataset in its own predictive model(s). Exchanging validated datasets may enable the network entities to train and test predictive models with diverse datasets, thereby improving robustness and effectiveness of the predictive models while avoiding security risks associated with corrupted data.

In some examples of the present disclosure, the network entity may perform a legitimacy test for another device, such as a second network entity. For example, the second network entity may transmit, to the network entity, a candidate dataset and a request for the network entity to perform a legitimacy test of the candidate dataset. The network entity may perform the legitimacy test and may return legitimacy information associated with the candidate dataset to the second network entity. In some cases, a network node, such as a core network node, may configure network entities with parameters for performing legitimacy tests. For example, the network entity may receive a legitimacy test configuration from a core network node that indicates one or more parameters for the legitimacy test, and the network entity may perform the legitimacy test in accordance with the one or more parameters.

Aspects of the disclosure are initially described in the context of wireless communications systems. Aspects of the disclosure are then discussed with reference to machine learning schemes and process flows. Aspects of the disclosure are further illustrated by and described with reference to apparatus diagrams, system diagrams, and flowcharts that relate to schemes for identifying corrupted datasets for machine learning security.

FIG. 1 illustrates an example of a wireless communications system 100 that supports schemes for identifying corrupted datasets for machine learning security in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130 (e.g., with a core network node), or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone)

base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support schemes for identifying corrupted datasets for machine learning security as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Devices in the wireless communications system 100 may implement machine learning or artificial intelligence techniques. For example, a network entity 105 may apply machine learning or artificial intelligence techniques to a data-driven algorithm that generates a set of outputs including predicted information, e.g., based on a set of inputs. This algorithm may be referred to as a predictive model, which may include or be an example of a machine learning model, an artificial intelligence model, a neural network model, or a combination thereof. The network entity 105 may collect data at the network entity 105, from other devices (e.g., UEs 115, network entities 105, or the like), or both, to provide to the predictive model as input data. The predictive model may include a model training function that prepares data (e.g., pre-processes, cleans, formats, and transforms input data) and performs training, validation, and testing of the predictive model using the prepared data. Training a predictive model may include providing training input data so that the predictive model "learns" appropriate outputs for a function or objective of the predictive model. The predictive model may be validated to confirm that appropriate outputs are generated for a set of known input data.

The predictive model may also include a model inference function that provides model inference outputs, such as predictions or decisions. The model inference function may prepare data (e.g., pre-process, clean, format, and transform input data) for the model inference. The network entity 105 may include or be an example of a machine learning "actor" that receives an output from the model inference function and triggers or performs corresponding actions based on the output. Such actions may be directed to other entities or devices or to the network entity 105 itself.

The network entity 105 may develop or generate a set of different predictive models for different functions (e.g., objectives). For example, the network entity 105 may generate multiple neural network, artificial intelligence, or machine learning models for network energy saving operations, load balancing, mobility optimization, beam management, CSI feedback, positioning procedures, or a combination thereof, among other examples. Further, in some cases, a same function (e.g., a beam prediction function to identify a transmit/receive beam for communications) may be associated with multiple different predictive models that are used in different scenarios, conditions, or the like. In any case, the network entity 105 may run a predictive model by providing input data to the predictive model, which may generate one or more outputs (e.g., predictions) for use by the network entity 105. Additionally, the network entity 105 may update the predictive model over time. For example, the network entity 105 may train, test, and validate the predictive model over time using different datasets as input data, such as datasets obtained by the network entity 105 from other devices or from measurements performed by the network entity 105.

For example, a network entity 105 may utilize a predictive model to determine when or if to activate or deactivate one or more cells. Here, the network entity 105 may gather input data related to traffic volume in the one or more cells, and an output of the predictive model may indicate whether a cell should be deactivated based on the traffic volume (e.g., the predictive model may indicate that a cell with relatively low traffic should be deactivated). In another example, the network entity 105 may use a predictive model to determine that UEs 115 of a deactivated cell may be offloaded to a new target cell. Other predictive models related to network energy saving operations may support load reduction or coverage modification by the network entity 105. In load balancing, the network entity 105 may rely on a predictive model to distribute load among cells and areas of cells, to transfer traffic from congested cells or areas of cells, or to offload UEs 115 from a cell, cell area, carrier, or RAT. Another predictive model may support handover parameter and handover operation improvements. As part of mobility, the network entity 105 may utilize a predictive model to predict a location, mobility, or performance of a UE 115, or to steer traffic.

In still other examples, the network entity 105 may implement a predictive model to enhance CSI feedback procedures, which may reduce overhead and improve accuracy. Additionally, or alternatively, the network entity 105 may perform beam management with reduced overhead and latency and improved accuracy based on a predictive model, e.g., to predict a most suitable beam in a time domain or a spatial domain. A predictive model may also increase accuracy in positioning procedures, such as in scenarios with significant non-line-of-sight (NLOS) propagation conditions.

As a specific example, the network entity 105 may use one or more predictive models to determine various beamforming parameters by computing values (e.g., initial values) for one or more beamforming parameters. Some of the functions may be, for example, beam prediction functions (e.g., which transmit/receive beam to use for communications at the UE and the network entity 105), channel property predictions (e.g., predicted delay spread values), connectivity predictions (e.g., when to perform a handover between different network entities 105, and which network entity 105 to select for a given channel condition or location), and the like. Further, the network entity 105 may update the predictive model(s) to appropriately match changing conditions. For instance, in cases where a UE 115 is in a changing channel environment (e.g., due to movement of the UE 115), the network entity 105 may update the predictive model(s) based on current channel conditions.

In some cases, other devices (e.g., network entities 105, UEs 115, or the like) in the wireless communications system 100 may additionally or alternatively utilize a predictive model, e.g., at various levels of collaboration with the network entity 105. For example, the network entity 105 may jointly perform machine learning techniques with one or more other devices. Additionally, or alternatively, the network entity 105 and the one or more other devices may each be associated with respective predictive models, but may exchange information related to machine learning (e.g., related to a predictive model) with one another. For instance, in federated learning, one or more UEs 115 may train and update local predictive models (e.g., at respective UEs 115) and may share model updates with the network entity 105. In another example, multiple UEs 115 and network entities 105 may exchange data and model updates to train a global predictive model to be applied in multiple scenarios and settings.

The techniques described herein support exchange of information related to legitimacy and performance of datasets for predictive models at devices in the wireless communications system 100. Perturbed or otherwise corrupted data may originate from adversarial devices, such as adversarial UEs 115, having malicious intent to inject error into or degrade performance of a predictive model. Additionally, a UE 115 (or other device) without malicious intent may experience a malfunction when performing measurements or otherwise obtaining a dataset, which may cause the dataset to be corrupted or otherwise invalid or unclean. Using a corrupt dataset as input data to a predictive model may produce inaccurate outputs, thereby degrading reliability of the predictive model. Further, training a predictive model using a corrupt dataset may change model boundaries used by the predictive model to generate outputs. That is, a corrupt dataset may change the behavior of the predictive model.

To avoid negatively impacting a predictive model, a network entity 105 in the wireless communication system 100 may perform a legitimacy test on a candidate dataset to determine if the candidate dataset is valid or corrupt. The network entity 105 may compare performance of a predictive model when the candidate dataset is used as input data (e.g., training data, testing data) to performance of the predictive model when the candidate set is not used. If the candidate dataset supports sufficient performance (e.g., passes the legitimacy test), the network entity 105 may determine that the candidate dataset is suitable for use in a predictive model. In contrast, if the candidate dataset negatively impacts the performance (e.g., fails the legitimacy test), the network entity 105 may determine that the candidate dataset is corrupt and should not be used for the predictive model.

The network entity 105 may share information about the legitimacy test for the candidate dataset with other network entities 105. For example, a second network entity 105 may transmit a request for valid datasets to be used for a predictive model at the second network entity 105. If the network entity 105 determined that the candidate dataset is valid (e.g., if the candidate dataset successfully passed the legitimacy test), the network entity 105 may transmit the candidate dataset to the second network entity in response to the request. Additionally, or alternatively, the second network entity 105 may transmit the candidate dataset to the network entity 105 for testing. The network entity 105 may perform the legitimacy test and transmit information associated with a result of the legitimacy test back to the second network entity 105. In some cases, the network entity 105 may include, as part of the information, one or more performance metrics associated with the candidate dataset, a testing scheme used in the legitimacy test, or the like, among other examples.

The legitimacy test may be performed by the network entity 105 in accordance with one or more parameters. In some cases, a network node, such as a core network 130, may configure network entities 105 with parameters for performing legitimacy tests. For example, the network entity 105 may receive a legitimacy test configuration from a core network 130 that indicates one or more parameters for the legitimacy test, and the network entity 105 may perform the legitimacy test in accordance with the one or more parameters.

Figure 2:
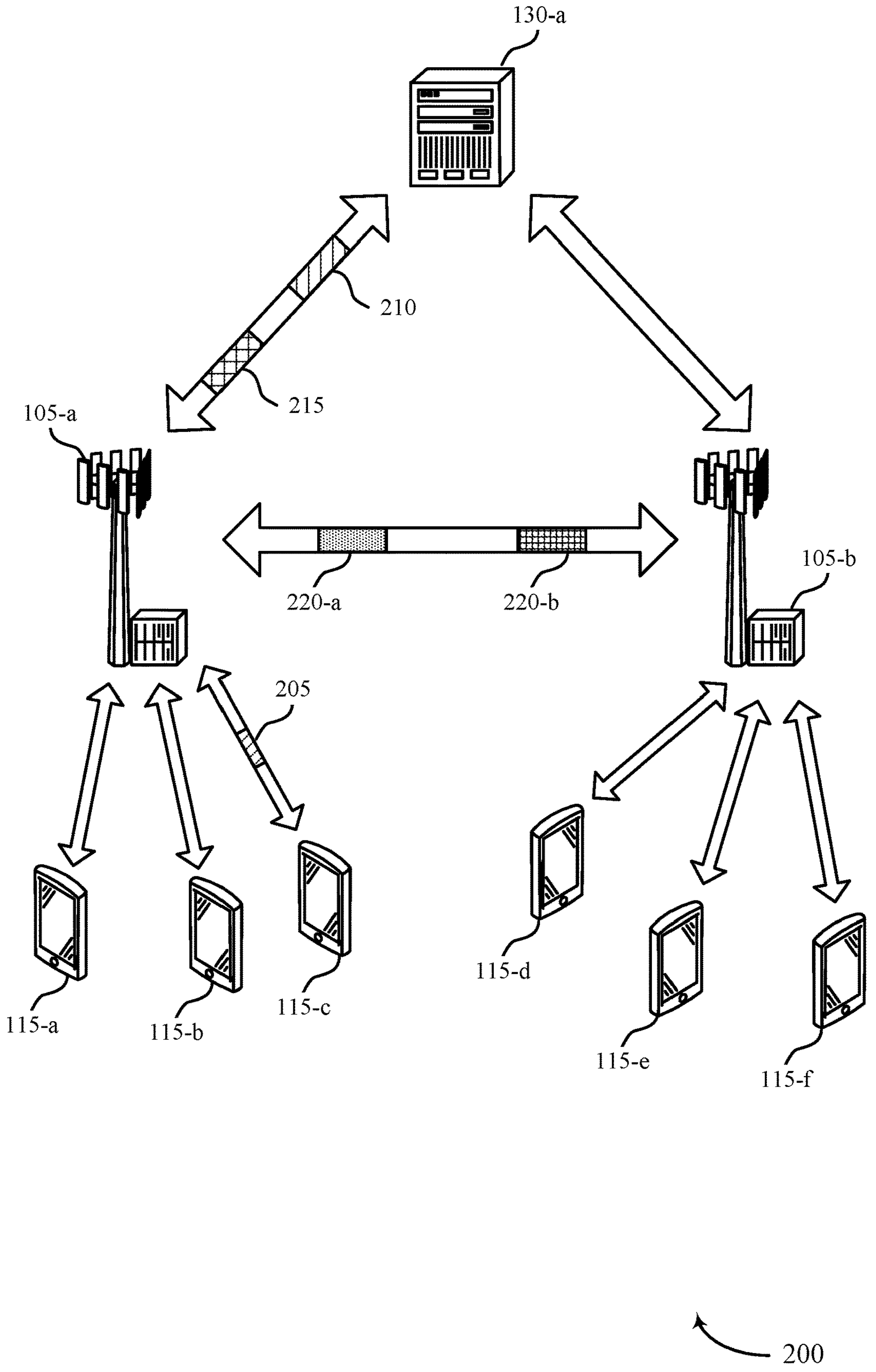
FIG. 2 illustrates an example of a wireless communications system that supports schemes for identifying corrupted datasets for machine learning security in accordance with one or more aspects of the present disclosure.

FIG. 2 illustrates an example of a wireless communications system 200 that supports schemes for identifying corrupted datasets for machine learning security in accordance with one or more aspects of the present disclosure. In some examples, wireless communications system 200 may implement aspects of wireless communications system 100 and may include multiple UEs 115, a network entity 105-*a* and a network entity 105-*b*, and a core network node 130-*a*, which may be examples of corresponding devices as described with reference to FIG. 1. Although described as communications between UEs 115, network entities 105, and the core network node 130-*a*, any type or quantity of devices may implement the techniques described herein. Further, the techniques described herein may be implemented by any type or quantity of devices of any wireless communications system.

The network entity 105-*a* and the network entity 105-*b* may communicate with one another and with one or more UEs 115. The network entity 105-*a* may communicate with a UE 115-*a*, a UE 115-*b*, and a UE 115-*c*. The network entity 105-*b* may communicate with a UE 115-*d*, a UE 115-*e*, and a UE 115-*f* Additionally, the network entity 105-*a* and the network entity 105-*b* may communicate with the core network node 130-*a*.

The network entity 105-*a*, the network entity 105-*b*, and the core network node 130-*a* may be examples of network nodes that implement data-driven machine learning techniques. Each of the network entities 105 and the core network node 130-*a* may utilize one or more predictive models (e.g., machine learning models, artificial intelligence models, neural network models, or the like) for one or more functions or objectives. In some examples, a predictive model may be generated (e.g., developed) and trained at a first network node (e.g., a core network node) and deployed (e.g., transmitted) to other network nodes for operation at the other network nodes. Additionally, the first network node may periodically deploy updates to the predictive model. In some cases, the first network node may collect (e.g., receive) training input data for the predictive model from the other network nodes. Centralization of predictive model training may reduce power consumption and processing. Alternatively, each network node may independently generate, train, and update respective predictive models, but may exchange data (e.g., input data).

In the example of FIG. 2, input data for a predictive model may be generated at a network entity 105 (e.g., based on measurements performed by the network entity 105) or collected by the network entity 105 from other devices, such as one or more network entities 105, UEs 115, or a combination thereof. For example, each of the UEs 115 may collect (e.g., generate) data based on measurements performed at the UE 115 and may report the data to the corresponding network entity 105-*a*. As a specific example, the network entity 105-*a* may configure measurements to be performed by the UE 115-*c*, e.g., by transmitting control signaling indicating a measurement configuration. The network entity 105-*a* may transmit one or more reference signals to the UE 115-*c*. The UE 115-*c* may perform measurements of the one or more reference signals based on the configuration to obtain a dataset 205 associated with the measurements. The UE 115-*c* may transmit a message indicating the dataset 205 to the network entity 105-*a*. In some cases, the UE 115-*c* may transmit a measurement report to the network entity 105-*a* that includes the dataset 205.

The network entity 105-*a* may provide the dataset 205 as input data to the predictive model. For example, the network entity 105-*a* may input the dataset 205 as training data to train the predictive model, testing data to test or validate the predictive model, or inference data to obtain an output. The output may trigger an action to be performed by the network entity 105-*a*. Before providing the dataset 205 as inference data, however, the network entity 105-*a* may determine whether the dataset 205 is legitimate (e.g., clean, valid) or illegitimate (e.g., unclean, corrupted, invalid, perturbed). To this end, the network entity 105-*a* may perform a legitimacy test of the dataset 205 based on the predictive model, the dataset 205, and one or more other datasets, where a result of the legitimacy test may indicate a validity of the dataset 205. That is, a successful result of the legitimacy test may correspond to the dataset 205 being valid, while a failure result of the legitimacy test may correspond to the dataset 205 being corrupted.

During the legitimacy test, the network entity 105-*a* may evaluate the performance of the predictive model when the dataset 205 is used as input data (e.g., testing data or training data). In some cases, the network entity 105-*a* may compare the performance of the predictive model using the dataset 205 against performance of the predictive model using the one or more other datasets, which may include or be an example of a trusted dataset. For example, the network entity 105-*a* may determine whether the dataset 205 provides a relatively accurate output for the predictive model by comparing an output of the predictive model using the dataset 205 to an expected output or range of outputs associated with a trusted dataset. If the dataset 205 corresponds to a negative performance impact, the dataset 205 may be corrupted. A trusted dataset may refer to a dataset that the network entity 105-*a* knows is legitimate, i.e., is not corrupted. In some cases, a trusted dataset may be a dataset transmitted to the network entity 105-*a* from a trusted device (e.g., a trusted UE 115 or a trusted network entity 105).

For example, the network entity 105-*a* may train the predictive model using a trusted dataset and may test the predictive model with the dataset 205, e.g., may provide the dataset 205 as testing input data to the predictive model. The network entity 105-*a* may evaluate the performance of the predictive model based on the output generated when the dataset 205 is used as testing input data. If the dataset 205 corresponds to relatively low or otherwise poor (e.g., inaccurate) performance, the network entity 105-*a* may identify the dataset 205 as being corrupted, e.g., the dataset 205 may fail the legitimacy test. Alternatively, if the dataset 205 provides adequate performance, the dataset 205 may pass the legitimacy test and the network entity 105-*a* may consider the dataset 205 as being valid.

In another example, the network entity 105-*a* may train the predictive model using the dataset 205 and may test the performance of the predictive model using a trusted dataset as testing input data. Here, the network entity 105-*a* may evaluate the performance of the predictive model corresponding to the trusted dataset. If the performance of the predictive model is unexpectedly low, the network entity 105-*a* may consider the dataset 205 as being corrupted, as the dataset 205 failed to appropriately train the predictive model. In some other cases, a trusted dataset may be unavailable, and the network entity 105-*a* may identify a corrupt dataset based on an average performance across a set of predictive models and sets of candidate datasets as described with reference to FIG. 3.

In some cases, the network entity 105-*a* may evaluate the performance of the predictive model (e.g., using the dataset 205 and at least one second dataset) based on one or more performance metrics, such as an average accuracy, a mean square error or a normalized mean square error, an achieved throughput, a block error rate (BLER), a bit error rate (BER), or a combination thereof. For example, the network entity 105-*a* may provide the dataset 205 as input data to the predictive model to obtain a first output and may provide the second dataset as input data to the predictive model to obtain a second output. The network entity 105-*a* may compare the first output against the second output to determine the one or more performance metrics. In some cases, the one or more performance metrics may be based on a testing scheme of the legitimacy test (e.g., whether the dataset 205 was used as testing input data or training input data, whether the second dataset was used as testing input data or training input data, or any combination thereof). Additionally, or alternatively, the one or more performance metrics may be relational, e.g., may indicate a relationship between performance of the first output and performance of the second output. For instance, a performance metric may include or be an example of a performance relation metric associated with the dataset 205 and the second dataset, or a performance difference associated with the dataset 205 and the second dataset.

The network entity 105-*a* may determine the result of the legitimacy test (e.g., a validity of the dataset 205) of the dataset 205 based on the one or more performance metrics. In some cases, the network entity 105-*a* may compare the one or more performance metrics to a performance threshold. If a performance metric satisfies the performance threshold, the network entity 105-*a* may consider the dataset 205 as legitimate, while if the performance metric fails to satisfy the performance threshold, the network entity 105-*a* may determine that the dataset 205 is corrupted.

Based on the legitimacy test (e.g., based on a result of the legitimacy test), the network entity 105-*a* may include or exclude the dataset 205 in subsequent input datasets for the predictive model. For example, the network entity 105-*a* may update the predictive model using one or more datasets that include the dataset 205 if the dataset 205 successfully passed the legitimacy test. Additionally, or alternatively, the network entity 105-*a* may include the dataset 205 as inference data, testing data, or training data for the predictive model. However, the network entity 105-*a* may exclude the dataset 205 from use in the predictive model if the dataset 205 fails the legitimacy test.

In some examples, the network entity 105-*a* may be configured with one or more parameters for the legitimacy test. For instance, the core network node 130-*a* may define a legitimacy test mechanism (e.g., procedure) for all network entities 105 participating in data collection (e.g., receiving datasets from UEs 115) to ensure that collected data is uncorrupted. The core network node 130-*a* may configure the one or more parameters for the legitimacy test and may transmit a message 210 to a set of network entities including the network entity 105-*a* indicating the one or more parameters. In some examples, the core network node 130-*a* may additionally transmit an indication of a request for the set of network entities to report respective results of legitimacy tests. In some cases, the legitimacy test mechanism and the one or more parameters may depend on a use case or objective for the predictive models. For example, the one or more parameters may include the one or more performance metrics and one or more performance thresholds used to evaluate performance of a dataset in the legitimacy test. Further, the one or more parameters may support accuracy in legitimacy tests by providing a framework for evaluating performance of a candidate dataset (e.g., the dataset 205).

In general, a candidate dataset may be associated with one or more features or attributes, which may in turn depend on an environment in which the candidate dataset was collected. These features may be referred to as input features and may correspond to independent variables input to the predictive model, such that values of the input features may affect the output generated by the predictive model. For example, the predictive model at the network entity 105-*a* may be an example of a machine learning model that predicts interference on future resources (e.g., time resources, frequency resources, spatial resources) based on interference present in previous resources. The UE 115-*c* may collect the dataset 205 in an environment with relatively high interference. If the network entity 105-*a* performs a legitimacy test of the dataset 205 based on comparing performance of the dataset 205 against performance of a second dataset that was collected under relatively low interference conditions, the dataset 205 may produce a negative performance impact and may fail the legitimacy test. That is, the dataset 205 and the second dataset may have relatively significant variations in their respective input features due to the differing collection conditions. As a result, the dataset 205 may be associated with poor performance of the predictive model even if the dataset 205 is not corrupted.

Thus, the one or more parameters may include one or more distribution metrics associated with statistical properties (e.g., a mean, variance, nth percentile value, or the like) of the dataset 205 and the second dataset and one or more similarity thresholds associated with the one or more distribution metrics, such that the network entity 105-*a* does not perform a legitimacy test using dissimilar datasets. That is, the network entity 105-*a* may perform the legitimacy test in accordance with the one or more distribution metrics and the one or more similarity thresholds to ensure that the dataset 205 is relatively similar in distribution to the second dataset, which may avoid erroneous legitimacy test results.

The network entity 105-*a* may determine one or more statistical properties associated with the dataset 205 and one or more statistical properties associated with the second dataset. The one or more statistical properties may be associated with one or more input features of the respective dataset or may be based on a set of sample statistics of the respective dataset. For example, the network entity 105-*a* may determine a first set of statistical properties of a first distribution of the dataset 205 (e.g., a distribution of one or more input features of the dataset 205) and a second set of statistical properties of a distribution of the second dataset (e.g., a distribution of one or more input features of the second dataset).

A distribution metric may correspond to or represent a relationship between the first distribution and the second distribution. For example, the one or more distribution metrics may include a distance between the first distribution and the second distribution (e.g., a Kolmogorov-Smirnov distance), an information divergence between the first distribution and the second distribution (e.g., a Kullback-Leibler divergence), a relationship between a mean of the first distribution and a mean of the second distribution, a relationship between a variance of the first distribution and a variance of the second distribution, or a relationship between an nth percentile value of the first distribution and an nth percentile value of the second distribution, among other examples. Thus, the network entity 105-*a* may determine or otherwise calculate one or more distribution metrics associated with the dataset 205 and the second dataset based on the first set of statistical properties and the second set of statistical properties.

The network entity 105-*a* may compare the one or more distribution metrics to one or more similarity thresholds to determine whether the first distribution of the dataset 205 and the second distribution of the second dataset are similar. A similarity threshold may indicate a measure of similarity between the dataset 205 and the second dataset and may include or be an example of a value (e.g., a maximum value) of a corresponding distribution metric. For example, the one or more similarity thresholds may include a distance (e.g., a maximum Kolmogorov-Smirnov distance), an information divergence (e.g., a maximum Kullback-Leibler divergence), or a difference between statistical properties (e.g., mean, variance, nth percentile value, or the like), among other examples.

In some examples, the network entity 105-*a* may determine whether to perform the legitimacy test using the dataset 205 and the second dataset based on a similarity threshold. For example, if a distribution metric satisfies the similarity threshold, the network entity 105-*a* may proceed with the legitimacy test. Alternatively, if the distribution metric fails to satisfy the similarity threshold, the network entity 105-*a* may refrain from performing the legitimacy test based on the dataset 205 and the second dataset. The network entity 105-*a* may determine a different dataset, such as a third dataset, to use for the legitimacy test of the dataset 205 based on a distribution metric associated with the third dataset and the dataset 205 satisfying a similarity threshold.

The core network node 130-*a* may configure the one or more distribution metrics and the one or more similarity thresholds such that a distribution metric satisfying a similarity threshold indicates that the dataset 205 and the second dataset may be used in the legitimacy test, e.g., may provide reliable results for the legitimacy test. In contrast, a distribution metric failing to satisfy the similarity threshold may indicate that the dataset 205 should not be compared to the second dataset in the legitimacy test, as the respective distributions of the dataset 205 and the second dataset may produce inaccurate or unreliable legitimacy test results.

The network entity 105-*a* may share a result of the legitimacy test of the dataset 205 with the network entity 105-*b*, the core network node 130-*a*, or both. For example, the network entity 105-*a* may transmit a message 215 to the core network node 130-*a* including information (e.g., legitimacy information) associated with the result of the legitimacy test. The legitimacy information may include an indication of the result of the legitimacy test, an indication that the result of the legitimacy test is based on the one or more performance metrics, an indication of the one or more performance metrics, a testing scheme used for the legitimacy test (e.g., whether the dataset 205 was used as testing input data or training input data, whether the second dataset was used as testing input data or training input data, or the like), whether the legitimacy test was based on one or more trusted datasets, or any combination thereof. In some examples, the network entity 105-*a* may transmit the message 215 in response to the request message transmitted by the core network node 130-*a*. In some cases, the network entity 105-*a* may include the dataset 205 in the message 215 with the legitimacy information.

The core network node 130-*a* may collect legitimacy information and corresponding datasets from multiple network entities, e.g., including the network entity 105-*a*. Additionally, the core network node 130-*a* may share collected datasets and legitimacy information with network entities. For example, a network entity may transmit a request for datasets for a predictive model, and the core network node 130-*a* may respond to the request by transmitting one or more datasets and corresponding legitimacy information, such as one or more corresponding performance metrics. In some cases, the network entity may transmit a request for datasets that satisfy an indicated performance threshold, and the core network node 130-*a* may transmit one or more datasets associated with performance metrics that satisfy the performance threshold. As another example, if a network entity is to train a predictive model, the network entity may transmit a request for valid datasets, and the core network node 130-*a* may transmit datasets to the network entity that are associated with successful legitimacy test results. In some examples, the network entity may transmit a request for datasets that are associated with a successful legitimacy test result and satisfy an indicated performance threshold.

The network entity 105-*a* may also receive such requests from other network entities and may transmit the dataset 205 and corresponding legitimacy information in response. Additionally, in some cases, the network entity 105-*a* may receive a candidate dataset for which the network entity 105-*a* is to perform a legitimacy test. For example, the network entity 105-*b* may receive a candidate dataset from the UE 115-*d* for a predictive model associated with the network entity 105-*b*. The network entity 105-*b* may transmit a message 220-*a* including the candidate dataset to the network entity 105-*a* for the network entity 105-*a* to perform a legitimacy test of the candidate dataset. The network entity 105-*a* may perform the legitimacy test of the candidate dataset as described herein and may transmit a message 220-*b* to the network entity 105-*b* indicating legitimacy information associated with a result of the legitimacy test of the candidate dataset.

For example, the network entity 105-*a* may indicate, in the message 220-*b*, a recommendation to include or exclude the candidate dataset in training or testing the predictive model associated with the network entity 105-*b* based on a result of the legitimacy test. Additionally, the network entity 105-*a* may indicate, in the message 220-*b*, one or more performance metrics on which the recommendation is based. For example, the network entity 105-*a* may indicate that the candidate dataset is to be included in one or more input datasets for the predictive model based on a successful result of the legitimacy test corresponding to a validity of the candidate dataset being valid. Alternatively, the network entity 105-*a* may indicate that the candidate dataset is to be excluded from the one or more input datasets for the predictive model based on a failure result of the legitimacy test corresponding to a validity of the candidate dataset being corrupted.

Figure 3A:
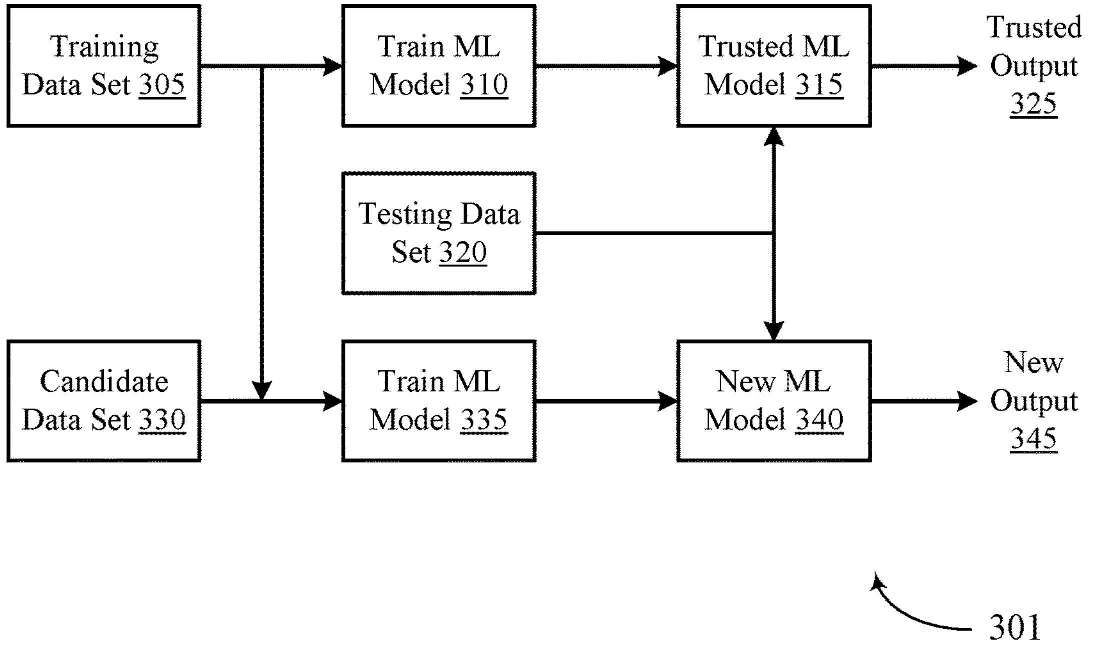
FIGS. 3A and 3B illustrate examples of legitimacy testing schemes that support schemes for identifying corrupted datasets for machine learning security in accordance with one or more aspects of the present disclosure.
Figure 3B:
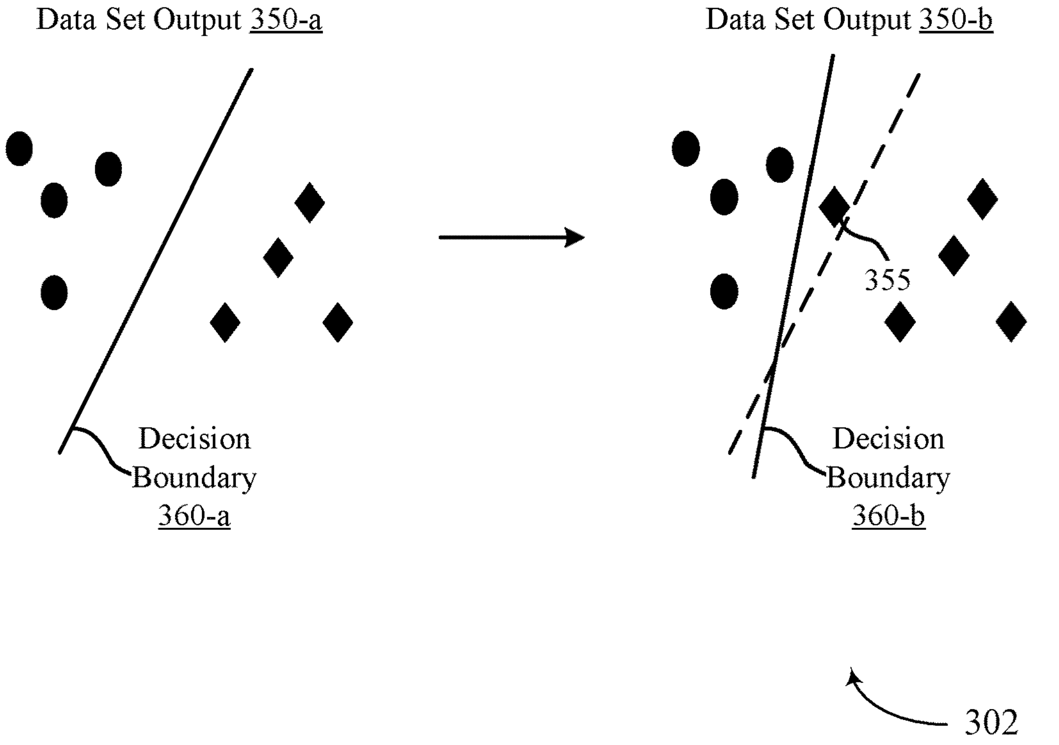

FIGS. 3A and 3B illustrate examples of legitimacy testing schemes 301 and 302 that support schemes for identifying corrupted datasets for machine learning security in accordance with one or more aspects of the present disclosure. The legitimacy testing schemes 301 and 302 may be implemented to realize aspects of the wireless communications system 100 or the wireless communications system 200. For example, the legitimacy testing schemes 301 and 302 may be implemented at a network entity or a core network node and may be associated with predictive models and candidate datasets as described with reference to FIGS. 1 and 2.

FIG. 3A illustrates a legitimacy testing scheme 301 that may be implemented at a network entity to perform a legitimacy test for a candidate dataset. At 305, the network entity may provide a training dataset as inputs to a machine learning model in order to train the machine learning model at 310. The training dataset may be an example of a dataset with a confirmed validity, such as a trusted dataset. Accordingly, the machine learning model generated by the training, e.g., at 315, may be considered a trusted machine learning model.

After training, at 320, a testing dataset may be input to the machine learning model to validate the machine learning model, e.g., to ensure that the machine learning model generates expected outputs based on known inputs. Performance of the machine learning model may be evaluated based on the machine learning model's ability to accurately predict an expected outcome. Because the machine learning model is a trusted model, the output of the machine learning model at 325 may be considered a trusted output, e.g., may be relatively accurate and reliable, and may be associated with relatively high performance.

To perform the legitimacy test, the network entity may input a candidate dataset to the machine learning model to compare performance of the machine learning model associated with the candidate dataset against performance of the machine learning model associated with the trusted dataset. For example, the network entity may add the candidate dataset to the training dataset at 330. At 335, the network entity may train the machine learning model using the training dataset including the candidate dataset. The machine learning model generated at 340 based on the training at 335 may be considered or understood as a new machine learning model different from the trusted machine learning model generated at 315. That is, a training dataset that is input to the new machine learning model may correspond to a new output at 345.

The network entity may evaluate a difference in performance of the trusted machine learning model and performance of the new machine learning model to determine a result of the legitimacy test for the candidate dataset. For example, the network entity may determine whether the candidate dataset is valid based on one or more performance metrics, e.g., based on comparing one or more performance metrics associated with the trusted output against one or more performance metrics associated with the new output. If the one or more performance metrics associated with the new output indicate that the candidate dataset has a negative performance impact on the machine learning model, the candidate dataset may fail the legitimacy test. Put another way, if including the candidate dataset in the training dataset causes the new machine learning model to produce significantly more errors than the trusted machine learning model, the candidate dataset may be corrupted. In such examples, the network entity may determine that the candidate dataset is corrupted and may reject the candidate dataset, e.g., may exclude the candidate dataset from training or testing datasets. Alternatively, if the candidate dataset provides a new output that corresponds to appropriate performance, the network entity may determine that the candidate dataset is valid, e.g., is associated with a successful result of the legitimacy test.

While FIG. 3A illustrates an example testing scheme for a legitimacy test, the techniques described herein support additional testing schemes associated with multiple configurations of training and testing datasets. For example, instead of adding the candidate dataset to the training dataset, the network entity may provide the candidate dataset as testing data input to the trusted machine learning model to obtain the new output at 345. In other examples, a trusted dataset may not be available to the network entity. Here, the network entity may collect or otherwise obtain multiple candidate datasets including one or more candidate datasets for which the legitimacy test is to be performed. The network entity and may use a first set of the candidate datasets as training datasets and a second set of the candidate datasets as testing datasets. The network entity may repeat the legitimacy testing scheme 301 with varying combinations of training datasets and testing datasets. The network entity may identify a corrupted candidate dataset based on a negative performance impact when the corrupted dataset is included in the training dataset or the testing dataset.

For example, the network entity may portion each candidate dataset into a training subset and a testing subset. The first set of candidate datasets may include the training subsets and the second set of candidate datasets may include the testing subsets. The network entity may train multiple machine learning models using varying combinations of training subsets from the first set of candidate datasets. For example, the network entity may train a first machine learning model using a first training subset from a first candidate dataset and a second training subset from a second candidate dataset, may train a second machine learning model using a third training subset from a third candidate dataset and a fourth training subset from a fourth candidate dataset, may train a third machine learning model using the first training subset and the third training subset, and so on.

The network entity may test each machine learning model with testing subsets corresponding to the training subsets used to train a respective machine learning model. For example, the network entity may test the first machine learning model using a first testing subset from the first candidate dataset and a second testing subset from the second candidate dataset, may test the second machine learning model using a third testing subset from the third candidate dataset and a fourth testing subset from the fourth candidate dataset, may test the third machine learning model using the first testing subset and the third testing subset, and so on.

The network entity may evaluate the performance of each machine learning model based on the respective generated outputs, e.g., based on one or more performance metrics. In some examples, the network entity may monitor for a performance gap between two or more machine learning models and may determine whether a candidate dataset is common across the two or more machine learning models. That is, if two (or more) poorly performing machine learning models are both tested or trained on a same candidate dataset, that candidate dataset may be corrupt. The network entity may, for instance, observe a negative performance impact associated with the first machine learning model and the third machine learning model, while the second machine learning model may not have a negative performance impact. Thus, the network entity may determine that the first candidate dataset is corrupt and corresponds to a failure result of the legitimacy test.

FIG. 3B includes dataset outputs 350-*a* and 350-*b* that may be examples of outputs from a first machine learning model and a second machine learning model in a legitimacy testing scheme 302. For example, the dataset output 350-*a* may correspond to a trusted output (e.g., at 325) of a machine learning model that is generated based on a trusted dataset being input to the machine learning model (e.g., at 305). In the example of FIG. 3B, the machine learning model may be an example of a linear two-class classifier that assigns one of two class labels to each data point of the trusted dataset. A decision boundary 360-*a* may separate data points associated with a first class label from data points associated with a second class label. For example, the machine learning model may calculate a value for a data point based on a linear combination of input features associated with the data point. Based on the value and the decision boundary 360-*a*, the machine learning model may assign either the first class label or the second class label.

The dataset output 350-*b* may correspond to a new output of the machine learning model generated based on a candidate dataset being input to the machine learning model. The candidate dataset may be a corrupt candidate dataset originating from an adversarial UE. For example, the adversarial UE may inject a data point 355 into the candidate dataset, which may be referred to as a poisoning attack. When the candidate dataset is used to train the machine learning model, the addition of the data point 355 may shift or otherwise change the decision boundary to a decision boundary 360-*b*. Thus, the performance of the machine learning model may be negatively impacted, as the machine learning model may incorrectly classify input data points based on the decision boundary 360-*b* (e.g., instead of the decision boundary 360-*a* associated with the trusted dataset).

The dataset outputs 350-*a* and 350-*b* may represent outputs associated with a legitimacy test of a candidate dataset corresponding to the dataset output 350-*b*. For example, the network entity may compare the dataset output 350-*a* (e.g., a performance metric associated with the dataset output 350-*a*) against the dataset output 350-*b* (e.g., a performance metric associated with the dataset output 350-*b*). Due to the decision boundary 360-*b* being different from the decision boundary 360-*a*, the network entity may obtain a performance metric for the candidate dataset that corresponds to a negative performance impact (e.g., compared to the performance metric associated with the dataset output 350-*a*). Based on the negative performance impact, the network entity may determine that the candidate dataset is corrupted, and may exclude the candidate dataset from use in the machine learning model.

Figure 4:
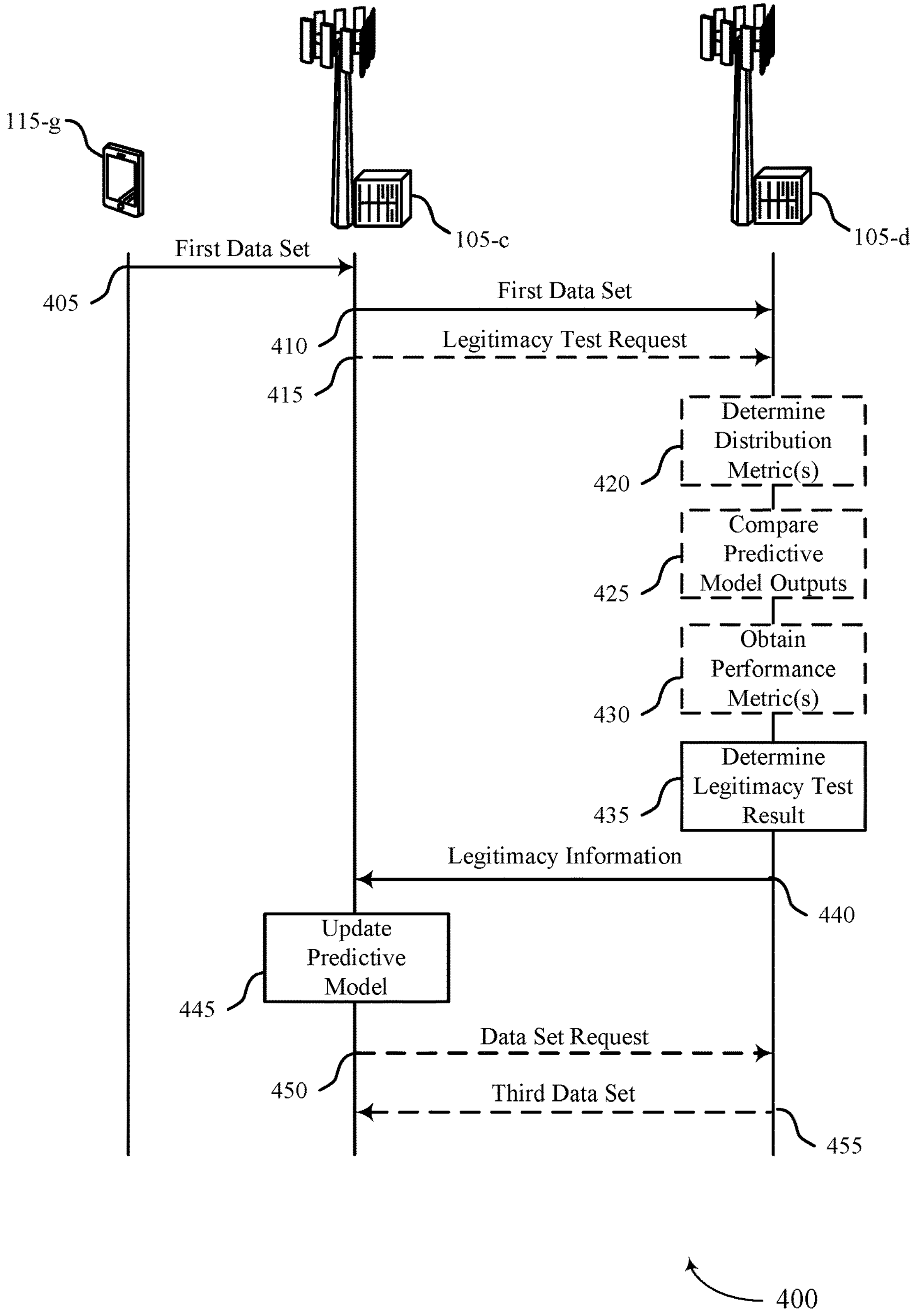
FIG. 4 illustrates an example of a process flow that supports schemes for identifying corrupted datasets for machine learning security in accordance with one or more aspects of the present disclosure.

FIG. 4 illustrates an example of a process flow 400 that supports schemes for identifying corrupted datasets for machine learning security in accordance with one or more aspects of the present disclosure. The process flow 400 may implement or be implemented to realize aspects of the wireless communications system 100, the wireless communications system 200, or the legitimacy testing schemes 301 or 302. For example, the process flow 400 illustrates communication between a UE 115-*c*, a network entity 105-*c*, and a network entity 105-*d*, which may be examples of UEs 115 and network entities 105 as described herein.

In the following description of the process flow 400, the operations may be performed (e.g., reported or provided) in a different order than the order shown, or the operations performed by the example devices may be performed in different orders or at different times. Additionally, although the process flow 400 is described with reference to the UE 115-*g*, the network entity 105-*c*, and the network entity 105-*d*, any type of device or combination of devices may perform the described operations. Some operations also may be omitted from the process flow 400, or other operations may be added to the process flow 400. Further, although some operations or signaling may be shown to occur at different times for discussion purposes, these operations may actually occur at the same time or otherwise concurrently.

At 405, the UE 115-*g* may transmit, and the network entity 105-*c* may receive, a first dataset that is a candidate dataset for a predictive model at the network entity 105-*c*. The first dataset may correspond to one or more measurements associated with (e.g., performed by) the UE 115-*g*. For example, the UE 115-*g* may perform one or more measurements based on receiving one or more reference signals (e.g., transmitted by the network entity 105-*c*), where the first dataset is based on the one or more measurements. In some examples, the UE 115-*g* may transmit a measurement report including or otherwise indicating the first dataset to the network entity 105-*c*.

At 410, the network entity 105-*c* may transmit, and the network entity 105-*d* may receive, the first dataset for a legitimacy test of the first dataset to be performed by the network entity 105-*d*. For example, the network entity 105-*c* may transmit a message indicating the first dataset. The legitimacy test may be utilized to determine a validity of the first dataset based on at least a second dataset, such as a trusted dataset.

At 415, the network entity 105-*c* may optionally transmit, and the network entity 105-*d* may receive, a legitimacy test request message. For example, the network entity 105-*c* may transmit, and the network entity 105-*d* may receive, a message indicating a request for the network entity 105-*d* to perform the legitimacy test of the first dataset. In some cases, the network entity 105-*c* may transmit a legitimacy test request and the first dataset together in a same message, while in other cases, the network entity 105-*c* may transmit the first dataset and the legitimacy test request in separate messages.

At 420, the network entity 105-*d* may determine one or more distribution metrics associated with the first dataset and the second dataset. The one or more distribution metrics may correspond to (e.g., be representative of) statistical properties of the first dataset and the second dataset. For example, the one or more distribution metrics may correspond to a distribution (e.g., a statistical distribution) of the first dataset (e.g., a distribution of one or more input features of the first dataset) and a distribution of the second dataset (e.g., a distribution of the one or more input features of the second dataset). In some cases, the one or more distribution metrics may correspond to or be an example of one or more parameters of a configuration for the legitimacy test.

The network entity 105-*d* may compare the one or more distribution metrics to a similarity threshold to determine whether the distribution of the first dataset and the distribution of the second dataset are similar. For example, if the one or more distribution metrics satisfy the similarity threshold, the network entity 105-*d* may determine that the distribution of the first dataset and the distribution of the second dataset are relatively similar, such that the first dataset and the second dataset may be compared against each other as part of the legitimacy test. The similarity threshold may be an example of one or more parameters of a configuration for the legitimacy test.

At 425, the network entity 105-*d* may perform the legitimacy test to determine a validity of the first dataset. The legitimacy test may include one or more predictive models, such as a second predictive model. The network entity 105-*d* may perform the legitimacy test by providing the first dataset as input data to the second predictive model to obtain a first output, providing the second dataset as input data to the second predictive model to obtain a second output (e.g., separate from the first output), and comparing the first output to the second output. For example, the network entity 105-*d* may compare a performance of the first output to a performance of the second output. In some cases, the network entity 105-*d* may compare the first output against the second output based on the distribution metric determined at 420 satisfying the similarity threshold.

In some examples, to perform the legitimacy test, the network entity 105-*d* may train the second predictive model using the second dataset, e.g., by providing the second dataset as training input data for the second predictive model to obtain the second output. In such examples, the network entity 105-*d* may test the second predictive model by providing the first dataset as test input data to obtain the first output. Alternatively, the network entity 105-*d* may train the second predictive model using the first dataset by providing the first dataset as training input data to obtain the first output. Here, the network entity 105-*d* may test the second predictive model with the second dataset by providing the second dataset as test input data to obtain the second output.

Additionally, or alternatively, to perform the legitimacy test, the network entity 105-*d* may train a set of predictive models including the second predictive model using a first set of datasets as input training data, and may test the set of predictive models using a second set of datasets as input testing data. The first set of datasets, the second set of datasets, or both may include the first dataset.

In some cases, the network entity 105-*d* may perform the legitimacy test based on a legitimacy test configuration including one or more parameters. For example, the network entity 105-*d* may receive a message indicating the one or more parameters for the legitimacy test. In some examples, the one or more parameters may include the At 430, the network entity 105-*d* may obtain or otherwise determine one or more performance metrics based on the comparison. The one or more performance metrics may include a performance relation metric associated with the first dataset and the second dataset, a performance difference associated with the first dataset and the second dataset, or a combination thereof. For example, a performance relation metric may indicate a relationship between performance of the second predictive model when the first dataset is included as input data and performance of the second predictive model when the first dataset is excluded from input data (e.g., when the second dataset is used as input data). Additionally, or alternatively, a performance difference may correspond to a difference in performance of the second predictive model when the first dataset is included as input data versus when the first dataset is excluded from input data. In some cases, the one or more performance metrics may be associated with a negative impact on an output of the second predictive model. For example, the one or more performance metrics may represent or be indicative of the first output having a negative impact on performance of the second predictive model compared to the second output.

In cases where the network entity 105-*d* trains and test a set of predictive models at 425, e.g., using a first set of datasets and a second set of datasets, the network entity 105-*d* may determine one or more performance metrics that are representative of a performance gap (e.g., a negative impact) on the set of predictive models when the first dataset is included in the first set of datasets, the second set of datasets, or both compared to when the first dataset is excluded from the first set of datasets, the second set of datasets, or both.

At 435, the network entity 105-*d* may determine a legitimacy test result for the first dataset based on the comparison at 425 and, in some cases, based on the one or more performance metrics. The network entity 105-*d* may determine a success result of the legitimacy test for the first dataset, where the success result is indicative of the first dataset being valid. Alternatively, the network entity 105-*d* may determine a failure result of the legitimacy test for the first dataset that indicates that the first dataset is invalid or corrupt. For example, the network entity 105-*d* may compare the one or more performance metrics associated with the first dataset to a performance threshold. The network entity 105-*d* may determine a success result of the legitimacy test for the first dataset based on determining that the one or more performance metrics satisfy the performance threshold. Otherwise, if the network entity 105-*d* determines that the one or more performance metrics fail to satisfy the performance threshold, the network entity 105-*d* may determine a failure result of the legitimacy test.

In some examples, at 435, the network entity 105-*d* may additionally determine a legitimacy test result for one or more other datasets, which may be received at the network entity 105-*d* from one or more other devices (e.g., other UEs 115 or network entities 105).

At 440, the network entity 105-*d* may transmit, and the network entity 105-*c* may receive, a message indicating legitimacy information associated with the legitimacy test (e.g., with the result of the legitimacy test) of the first dataset. For example, the network entity 105-*d* may transmit, and the network entity 105-*c* may receive, an indication of the result of the legitimacy test (e.g., an indication of a failure result or an indication of a successful result), a recommendation to include or exclude the first dataset as input data to the predictive model at the network entity 105-*c*, or a combination thereof. In some examples, if the network entity 105-*c* transmitted the legitimacy test request message at 415, the network entity 105-*d* may transmit the legitimacy information at 440 based on receiving the legitimacy test request.

For example, the network entity 105-*d* may include, as part of the legitimacy information, an indication that the first dataset is to be included in one or more input datasets for the predictive model at the network entity 105-*c* based on the result of the legitimacy test, e.g., based on the network entity 105-*d* determining a success result of the legitimacy test for the first dataset. Alternatively, the legitimacy information may indicate that the first dataset is to be excluded from the one or more input datasets for the predictive model based on the network entity 105-*d* determining a failure result of the legitimacy test for the first dataset.

In some examples, the legitimacy information may further indicate that the legitimacy test (e.g., the result of the legitimacy test) is based on the one or more performance metrics associated with the second predictive model using the first dataset and the second dataset, e.g., as obtained at 430. Additionally, or alternatively, the legitimacy information may indicate the one or more performance metrics, one or more values corresponding to the one or more performance metrics, or a combination thereof.

In some cases, the legitimacy information may further indicate a testing scheme used for the legitimacy test, e.g., used to obtain the one or more performance metrics. For example, the legitimacy information may indicate that, to perform the legitimacy test, the network entity 105-*d* used the first dataset to train the second predictive model and used the second dataset to test the second predictive model. Additionally, or alternatively, the legitimacy information may indicate that the network entity 105-*d* used the second dataset to train the second predictive model and used the first dataset to test the second predictive model. In some cases, the legitimacy information may indicate that the second predictive model was trained on a first set of datasets and was tested on a second datasets. In some examples, the legitimacy information may indicate that the second dataset is a trusted dataset or may indicate that the second dataset is not a trusted dataset.

In some cases, the network entity 105-*d* may include, in the message, legitimacy information associated with one or more other datasets. For example, the network entity 105-*d* may have performed additional legitimacy tests for the one or more other datasets and may indicate a result of the respective legitimacy test for each of the one or more datasets.

At 445, the network entity 105-*c* may update the predictive model using one or more datasets based on the legitimacy information received at 440. For example, the network entity 105-*c* may update the predictive model using one or more datasets including at least the first dataset based on the legitimacy information indicating a success result of the legitimacy test for the first dataset, e.g., indicating that the first dataset is valid. Alternatively, the network entity 105-*c* may update the predictive model using one or more datasets excluding the first dataset based on the legitimacy information indicating a failure result of the legitimacy test for the first dataset, e.g., indicating that the first dataset is corrupt.

At 450, the network entity 105-*c* may optionally transmit, and the network entity 105-*d* may receive, a message indicating a request for valid (e.g., legitimate) datasets. For example, the message may indicate a request for datasets associated with one or more performance metrics that satisfy a performance threshold. In some cases, the message may indicate the performance threshold. The network entity 105-*d* may determine or otherwise identify one or more datasets at the network entity 105-*d* that satisfy the performance threshold, such as one or more trusted datasets, one or more datasets received by the network entity 105-*d* from other UEs 115 or network entities 105, or one or more datasets measured by the network entity 105-*d*. For example, the network entity 105-*d* may determine that a third dataset satisfies the performance threshold. In some cases, the network entity 105-*d* may determine that the third dataset satisfies the performance threshold based on performing a legitimacy test for the third dataset, or based on receiving legitimacy information associated with the third dataset (e.g., from the same device that transmitted the third dataset to the network entity 105-*d*).

At 455, the network entity 105-*d* may transmit, and the network entity 105-*c* may receive, the third dataset that satisfies the performance threshold. In some cases, based on receiving the third dataset, the network entity 105-*c* may update the predictive model using the third dataset (e.g., instead of or in addition to the first dataset). In some examples, the network entity 105-*c* may train or test the predictive model using the third dataset.

Figure 5:
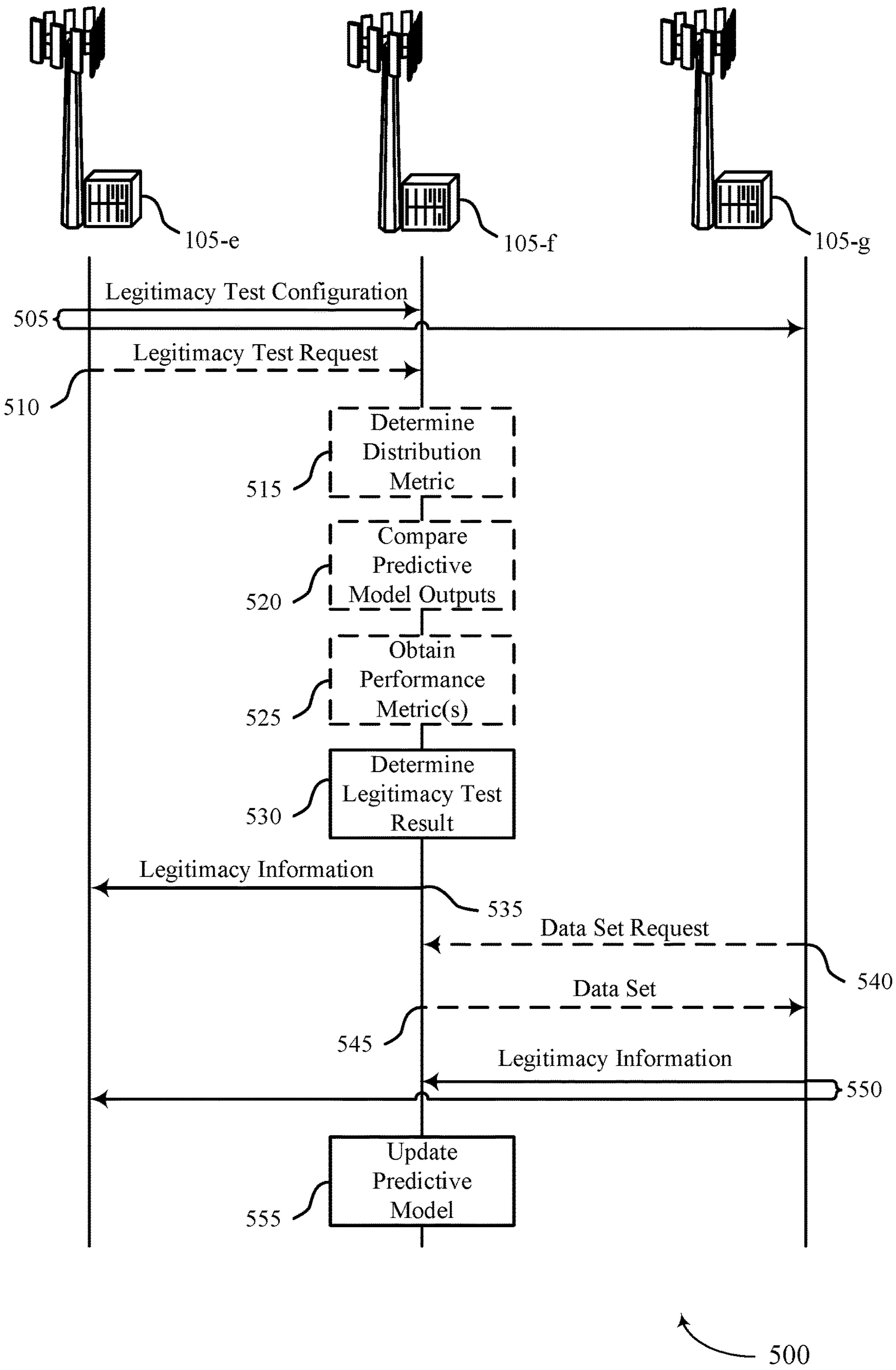
FIG. 5 illustrates an example of a process flow that supports schemes for identifying corrupted datasets for machine learning security in accordance with one or more aspects of the present disclosure.

FIG. 5 illustrates an example of a process flow 500 that supports schemes for identifying corrupted datasets for machine learning security in accordance with one or more aspects of the present disclosure. The process flow 500 may implement or be implemented to realize aspects of the wireless communications system 100, the wireless communications system 200, or the legitimacy testing schemes 301 or 302. For example, the process flow 500 illustrates communication between a network entity 105-*e*, a network entity 105-*f*, and a network entity 105-*g*, which may be examples of network entities 105 as described herein.

In the following description of the process flow 500, the operations may be performed (e.g., reported or provided) in a different order than the order shown, or the operations performed by the example devices may be performed in different orders or at different times. Additionally, although the process flow 500 is described with reference to the network entities 105, any type of device or combination of devices may perform the described operations. Some operations also may be omitted from the process flow 500, or other operations may be added to the process flow 500. Further, although some operations or signaling may be shown to occur at different times for discussion purposes, these operations may actually occur at the same time or otherwise concurrently.

At 505, the network entity 105-*e* may transmit, and the network entity 105-*f* and the network entity 105-*g* may receive, a message indicating one or more parameters for a configuration of a legitimacy test. For example, the network entity 105-*e* may configure the one or more parameters for a legitimacy test to be performed at each of the network entity 105-*f* and the network entity 105-*g*. The legitimacy test may determine a validity of one or more datasets associated with a predictive model. The one or more parameters may include or be examples of one or more distribution metrics, one or more similarity thresholds corresponding to the one or more distribution metrics, or a combination thereof. The one or more distribution metrics may be associated with statistical properties of datasets associated with a legitimacy test.

At 510, the network entity 105-*e* may optionally transmit, and the network entity 105-*f* may receive, a legitimacy test request message. For example, the network entity 105-*e* may transmit, and the network entity 105-*f* may receive, a message indicating a request for the network entity 105-*f* to perform the legitimacy test for one or more datasets associated with a predictive model of the network entity 105-*f*.

The network entity 105-*f* may obtain the one or more datasets from one or more UEs or by performing measurements at the network entity 105-*f*. For example, the network entity 105-*f* may receive a first dataset from a UE, where the first dataset corresponds to one or more measurements performed by the UE and may be considered a candidate dataset for the predictive model. The network entity 105-*f* may perform the legitimacy test in accordance with the one or more parameters received at 505 and using the first dataset and at least one second dataset to determine a validity of the first dataset.

At 515, the network entity 105-*f* may determine one or more distribution metrics associated with the first dataset and the second dataset based on the legitimacy test configuration. For example, the one or more parameters of the legitimacy test configuration may include one or more distribution metrics that correspond to (e.g., represent) statistical properties of the first dataset and the second dataset. Based on the one or more parameters, the network entity 105-*f* may identify (e.g., calculate) values for the one or more distribution metrics of the first dataset and the second dataset. For example, the one or more distribution metrics may correspond to a distribution (e.g., a statistical distribution) of the first dataset (e.g., a distribution of one or more input features of the first dataset) and a distribution of the second dataset (e.g., a distribution of the one or more input features of the second dataset).

The network entity 105-*f* may compare the one or more distribution metrics to one or more similarity thresholds included in the one or more parameters of the legitimacy test configuration to determine whether the distribution of the first dataset and the distribution of the second dataset are similar. For example, if the one or more distribution metrics satisfy a similarity threshold, the network entity 105-*f* may determine that the distribution of the first dataset and the distribution of the second dataset are relatively similar, such that the first dataset and the second dataset may be compared against each other as part of the legitimacy test.

At 520, the network entity 105-*f* may perform the legitimacy test in accordance with the legitimacy test configuration to determine a validity of the first dataset. The legitimacy test may include one or more predictive models, such as a second predictive model. The network entity 105-*f* may perform the legitimacy test by providing the first dataset as input data to the second predictive model to obtain a first output, providing the second dataset as input data to the second predictive model to obtain a second output (e.g., separate from the first output), and comparing the first output to the second output. For example, the network entity 105-*f* may compare a performance of the first output to a performance of the second output (e.g., based on one or more performance metrics). The network entity 105-*f* may compare the first output against the second output based on the distribution metric determined at 515 satisfying the similarity threshold.

In some examples, to perform the legitimacy test, the network entity 105-*f* may train the second predictive model using the second dataset, e.g., by providing the second dataset as training input data for the second predictive model to obtain the second output. In such examples, the network entity 105-*f* may test the second predictive model by providing the first dataset as test input data to obtain the first output. Alternatively, the network entity 105-*f* may train the second predictive model using the first dataset by providing the first dataset as training input data to obtain the first output. Here, the network entity 105-*f* may test the second predictive model with the second dataset by providing the second dataset as test input data to obtain the second output.

Additionally, or alternatively, to perform the legitimacy test, the network entity 105-*f* may train a set of predictive models including the second predictive model using a first set of datasets as input training data, and may test the set of predictive models using a second set of datasets as input testing data. The first set of datasets, the second set of datasets, or both may include the first dataset.

At 430, the network entity 105-*f* may obtain or otherwise determine one or more performance metrics based on the comparison. The one or more performance metrics may include a performance relation metric associated with the first dataset and the second dataset, a performance difference associated with the first dataset and the second dataset, or a combination thereof. For example, a performance relation metric may indicate a relationship between performance of the second predictive model when the first dataset is included as input data and performance of the second predictive model when the first dataset is excluded from input data (e.g., when the second dataset is used as input data). Additionally, or alternatively, a performance difference may correspond to a difference in performance of the second predictive model when the first dataset is included as input data versus when the first dataset is excluded from input data. In some cases, the one or more performance metrics may be associated with a negative impact on an output of the second predictive model. For example, the one or more performance metrics may represent or be indicative of the first output having a negative impact on performance of the second predictive model compared to the second output.

In cases where the network entity 105-*f* trains and tests a set of predictive models at 520, e.g., using a first set of datasets and a second set of datasets, the network entity 105-*f* may determine one or more performance metrics that are representative of a performance gap (e.g., a negative impact) on the set of predictive models when the first dataset is included in the first set of datasets, the second set of datasets, or both compared to when the first dataset is excluded from the first set of datasets, the second set of datasets, or both.

At 530, the network entity 105-*f* may determine a legitimacy test result for the first dataset based on the comparison at 520 and, in some cases, based on the one or more performance metrics. The network entity 105-*f* may determine a success result of the legitimacy test for the first dataset, where the success result is indicative of the first dataset being valid. Alternatively, the network entity 105-*f* may determine a failure result of the legitimacy test for the first dataset that indicates that the first dataset is invalid or corrupt. For example, the network entity 105-*f* may compare the one or more performance metrics associated with the first dataset to a performance threshold. The network entity 105-*f* may determine a success result of the legitimacy test for the first dataset based on determining that the one or more performance metrics satisfy the performance threshold. Otherwise, if the network entity 105-*f* determines that the one or more performance metrics fail to satisfy the performance threshold, the network entity 105-*f* may determine a failure result of the legitimacy test.

In some examples, at 530, the network entity 105-*f* may additionally determine a legitimacy test result for one or more other datasets, which may be received at the network entity 105-*f* from one or more other devices (e.g., other UEs 115 or network entities 105).

At 535, the network entity 105-*f* may transmit, and the network entity 105-*e* may receive, a message indicating legitimacy information associated with the legitimacy test (e.g., with the result of the legitimacy test) of the first dataset. For example, the network entity 105-*f* may transmit, and the network entity 105-*e* may receive, an indication of the result of the legitimacy test (e.g., an indication of a failure result or an indication of a successful result). In some examples, if the network entity 105-*e* transmitted the legitimacy test request message at 505, the network entity 105-*f* may transmit the legitimacy information at 535 based on receiving the legitimacy test request.

In some examples, the legitimacy information may further indicate that the legitimacy test (e.g., the result of the legitimacy test) is based on the one or more performance metrics associated with the second predictive model using the first dataset and the second dataset, e.g., as obtained at 525. Additionally, or alternatively, the legitimacy information may indicate the one or more performance metrics, one or more values corresponding to the one or more performance metrics, or a combination thereof.

In some cases, the network entity 105-*f* may include, in the message, legitimacy information associated with one or more other datasets. For example, the network entity 105-*f* may have performed additional legitimacy tests for the one or more other datasets and may indicate a result of the respective legitimacy test for each of the one or more datasets.

At 540, the network entity 105-*g* may transmit, and the network entity 105-*f* may receive, a message indicating a request for valid (e.g., legitimate) datasets. For example, the message may indicate a request for datasets associated with one or more performance metrics that satisfy a performance threshold. In some cases, the message may indicate the performance threshold. The network entity 105-*f* may determine or otherwise identify one or more datasets at the network entity 105-*f* that satisfy the performance threshold, such as one or more trusted datasets or one or more datasets tested for legitimacy by the network entity 105-*f*. For example, the network entity 105-*f* may determine that the first dataset satisfies the performance threshold, e.g., based on the comparison at 520 and the performance metric(s) obtained at 525.

At 545, the network entity 105-*f* may transmit, and the network entity 105-*g* may receive, the first dataset based on the request. In some cases, based on receiving the first dataset, the network entity 105-*g* may update, train, or test a predictive model at the network entity 105-*g* using the first dataset.

In some examples, at 545, the network entity 105-*f* may include information associated with a result of the legitimacy test of the first dataset in the transmission to the network entity 105-*g*. For example, the network entity 105-*f* may indicate the one or more performance metrics obtained at 525 to the network entity 105-*g*.

At 550, the network entity 105-*g* may transmit, and the network entity 105-*e* and the network entity 105-*f* may receive, a message indicating legitimacy information associated with a legitimacy test (e.g., with a result of the legitimacy test) of one or more third datasets. For example, the network entity 105-*g* may perform a legitimacy test on one or more third datasets based on receiving the legitimacy test configuration at 505 and, in some cases, based on receiving a legitimacy test request from the network entity 105-*e*. The message may indicate a result of the legitimacy test (e.g., an indication of a failure result or an indication of a successful result) for the one or more third datasets. In some examples, the legitimacy information may further indicate that the legitimacy test (e.g., the result of the legitimacy test) is based on one or more performance metrics associated with the legitimacy test and the one or more third datasets. Additionally, or alternatively, the legitimacy information may indicate the one or more performance metrics, one or more values corresponding to the one or more performance metrics, or a combination thereof. In some cases, the network entity 105-*e* may include the one or more third datasets in the message.

At 555, the network entity 105-*f* may update the predictive model using one or more datasets based on the legitimacy test result determined at 530. For example, the network entity 105-*f* may update the predictive model using one or more datasets including at least the first dataset based on a success result of the legitimacy test for the first dataset, e.g., indicating that the first dataset is valid. Alternatively, the network entity 105-*f* may update the predictive model using one or more datasets excluding the first dataset based on a failure result of the legitimacy test for the first dataset, e.g., indicating that the first dataset is corrupt. In some examples, the one or more datasets may include the one or more third datasets received from the network entity 105-*g* at 550 based on the legitimacy information associated with the one or more third datasets.

Figure 6:
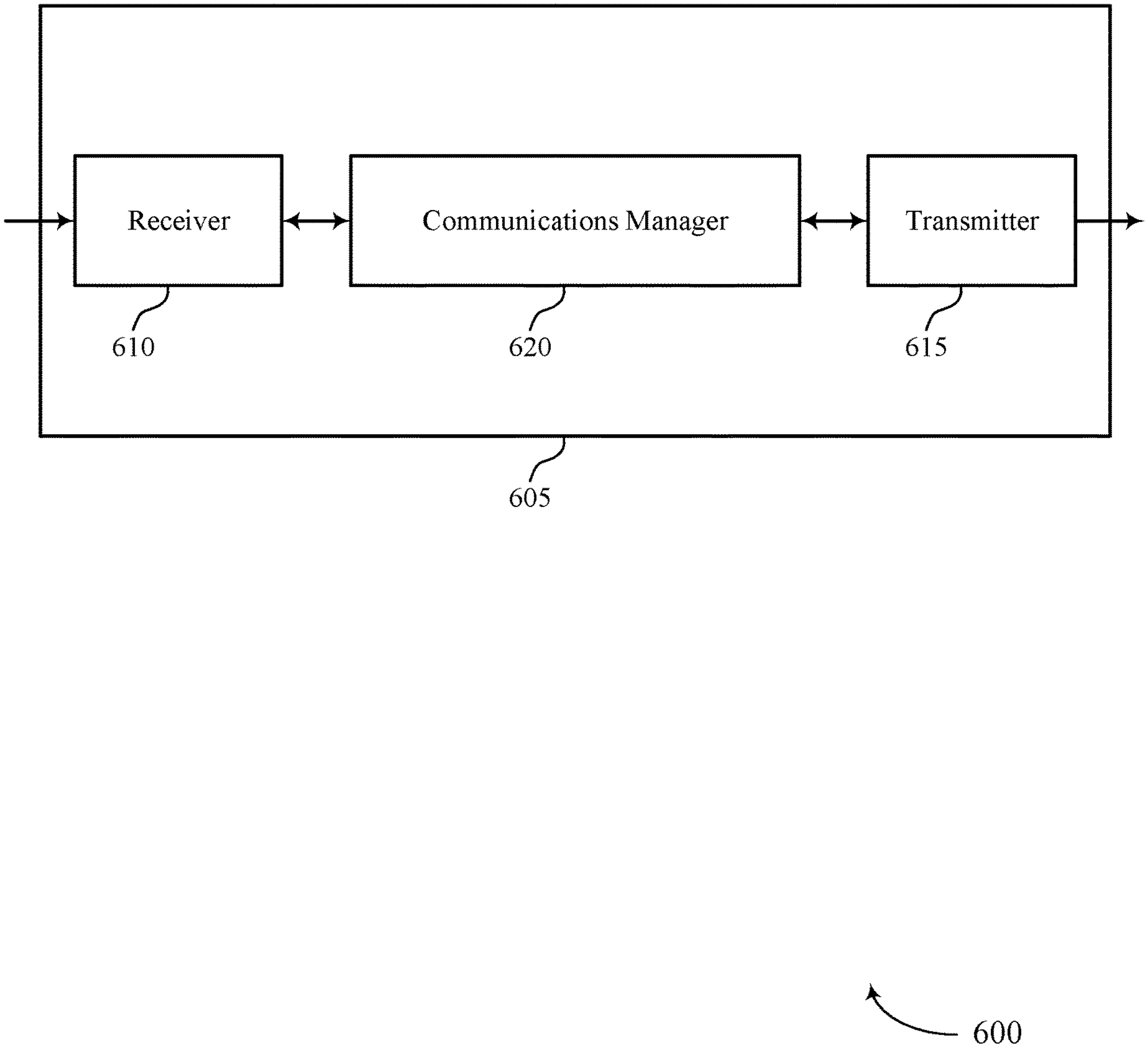
FIGS. 6 and 7 show block diagrams of devices that support schemes for identifying corrupted datasets for machine learning security in accordance with one or more aspects of the present disclosure.

FIG. 6 shows a block diagram 600 of a device 605 that supports schemes for identifying corrupted datasets for machine learning security in accordance with one or more aspects of the present disclosure. The device 605 may be an example of aspects of a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The communications manager 620, the receiver 610, the transmitter 615, or various combinations thereof or various components thereof may be examples of means for performing various aspects of schemes for identifying corrupted datasets for machine learning security as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first network entity in accordance with examples as disclosed herein. For example, the communications manager 620 may be configured as or otherwise support a means for receiving a first dataset for a predictive model, the first dataset corresponding to one or more measurements associated with a UE. The communications manager 620 may be configured as or otherwise support a means for transmitting, to a second network entity, the first dataset for a legitimacy test of the first dataset, the legitimacy test to determine a validity of the first dataset based on at least one second dataset. The communications manager 620 may be configured as or otherwise support a means for receiving, from the second network entity, a message including information associated with a result of the legitimacy test of the first dataset. The communications manager 620 may be configured as or otherwise support a means for updating the predictive model using one or more datasets based on the information, where the one or more datasets include the first dataset or exclude the first dataset based on the result of the legitimacy test.

Additionally, or alternatively, the communications manager 620 may support wireless communications at a second network entity in accordance with examples as disclosed herein. For example, the communications manager 620 may be configured as or otherwise support a means for receiving, from a first network entity, a first dataset for a predictive model at the first network entity, the first dataset corresponding to one or more measurements associated with a UE. The communications manager 620 may be configured as or otherwise support a means for performing a legitimacy test of the first dataset based on the first dataset and at least one second dataset, the legitimacy test to determine a validity of the first dataset. The communications manager 620 may be configured as or otherwise support a means for transmitting, to the first network entity, a message including information associated with a result of the legitimacy test of the first dataset.

Additionally, or alternatively, the communications manager 620 may support wireless communications at a network entity in accordance with examples as disclosed herein. For example, the communications manager 620 may be configured as or otherwise support a means for receiving, from a core network node, a message indicating one or more parameters for a legitimacy test for datasets associated with a predictive model. The communications manager 620 may be configured as or otherwise support a means for receiving a first dataset for the predictive model, the first dataset corresponding to one or more measurements associated with a UE. The communications manager 620 may be configured as or otherwise support a means for performing the legitimacy test of the first dataset based on the first dataset and at least one second dataset and in accordance with the one or more parameters, the legitimacy test to determine a validity of the first dataset. The communications manager 620 may be configured as or otherwise support a means for updating the predictive model using one or more datasets, where the one or more datasets include the first dataset or exclude the first dataset based on a result of the legitimacy test.

Additionally, or alternatively, the communications manager 620 may support wireless communications at a core network node in accordance with examples as disclosed herein. For example, the communications manager 620 may be configured as or otherwise support a means for configuring one or more parameters of a legitimacy test for datasets associated with a predictive model, the legitimacy test to determine a validity of a dataset. The communications manager 620 may be configured as or otherwise support a means for transmitting, to a set of network entities, a message indicating the one or more parameters for the legitimacy test.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for improved security and robustness in machine learning models. For example, the device 605 may select or reject datasets to use for a predictive model based on legitimacy test results, which may enable the device 605 to avoid corrupt or invalid datasets. Additionally, testing datasets for validity before providing them as inputs to a predictive model may improve accuracy of the predictive model, which may reduce processing at the device 605.

Figure 7:
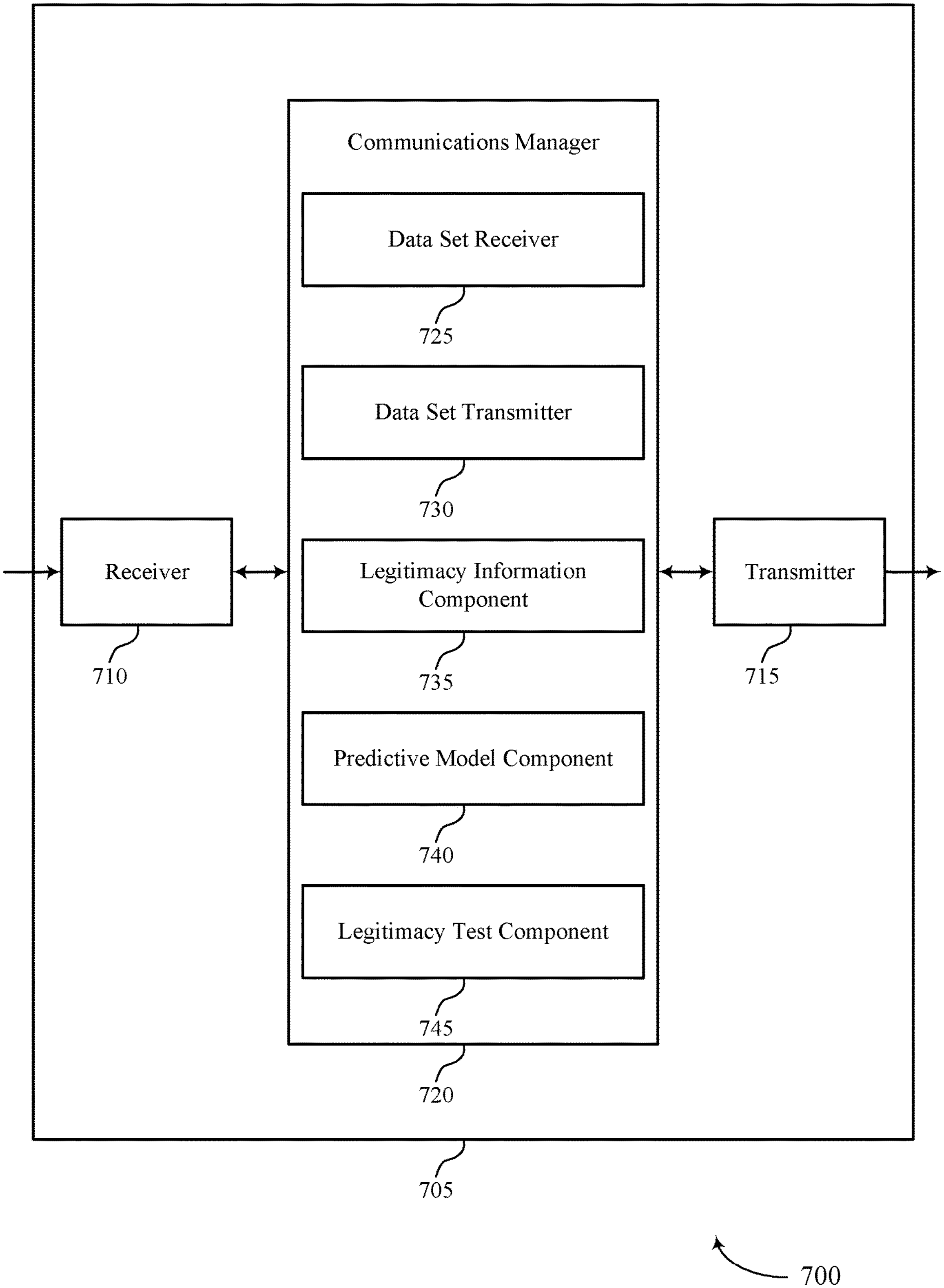

FIG. 7 shows a block diagram 700 of a device 705 that supports schemes for identifying corrupted datasets for machine learning security in accordance with one or more aspects of the present disclosure. The device 705 may be an example of aspects of a device 605 or a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The device 705, or various components thereof, may be an example of means for performing various aspects of schemes for identifying corrupted datasets for machine learning security as described herein. For example, the communications manager 720 may include a dataset receiver 725, a dataset transmitter 730, a legitimacy information component 735, a predictive model component 740, a legitimacy test component 745, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first network entity in accordance with examples as disclosed herein. The dataset receiver 725 may be configured as or otherwise support a means for receiving a first dataset for a predictive model, the first dataset corresponding to one or more measurements associated with a UE. The dataset transmitter 730 may be configured as or otherwise support a means for transmitting, to a second network entity, the first dataset for a legitimacy test of the first dataset, the legitimacy test to determine a validity of the first dataset based on at least one second dataset. The legitimacy information component 735 may be configured as or otherwise support a means for receiving, from the second network entity, a message including information associated with a result of the legitimacy test of the first dataset. The predictive model component 740 may be configured as or otherwise support a means for updating the predictive model using one or more datasets based on the information, where the one or more datasets include the first dataset or exclude the first dataset based on the result of the legitimacy test.

Additionally, or alternatively, the communications manager 720 may support wireless communications at a second network entity in accordance with examples as disclosed herein. The dataset receiver 725 may be configured as or otherwise support a means for receiving, from a first network entity, a first dataset for a predictive model at the first network entity, the first dataset corresponding to one or more measurements associated with a UE. The legitimacy test component 745 may be configured as or otherwise support a means for performing a legitimacy test of the first dataset based on the first dataset and at least one second dataset, the legitimacy test to determine a validity of the first dataset. The legitimacy information component 735 may be configured as or otherwise support a means for transmitting, to the first network entity, a message including information associated with a result of the legitimacy test of the first dataset.

Additionally, or alternatively, the communications manager 720 may support wireless communications at a network entity in accordance with examples as disclosed herein. The legitimacy test component 745 may be configured as or otherwise support a means for receiving, from a core network node, a message indicating one or more parameters for a legitimacy test for datasets associated with a predictive model. The dataset receiver 725 may be configured as or otherwise support a means for receiving a first dataset for the predictive model, the first dataset corresponding to one or more measurements associated with a UE. The legitimacy test component 745 may be configured as or otherwise support a means for performing the legitimacy test of the first dataset based on the first dataset and at least one second dataset and in accordance with the one or more parameters, the legitimacy test to determine a validity of the first dataset. The predictive model component 740 may be configured as or otherwise support a means for updating the predictive model using one or more datasets, where the one or more datasets include the first dataset or exclude the first dataset based on a result of the legitimacy test.

Additionally, or alternatively, the communications manager 720 may support wireless communications at a core network node in accordance with examples as disclosed herein. The legitimacy test component 745 may be configured as or otherwise support a means for configuring one or more parameters of a legitimacy test for datasets associated with a predictive model, the legitimacy test to determine a validity of a dataset. The legitimacy test component 745 may be configured as or otherwise support a means for transmitting, to a set of network entities, a message indicating the one or more parameters for the legitimacy test.

Figure 8:
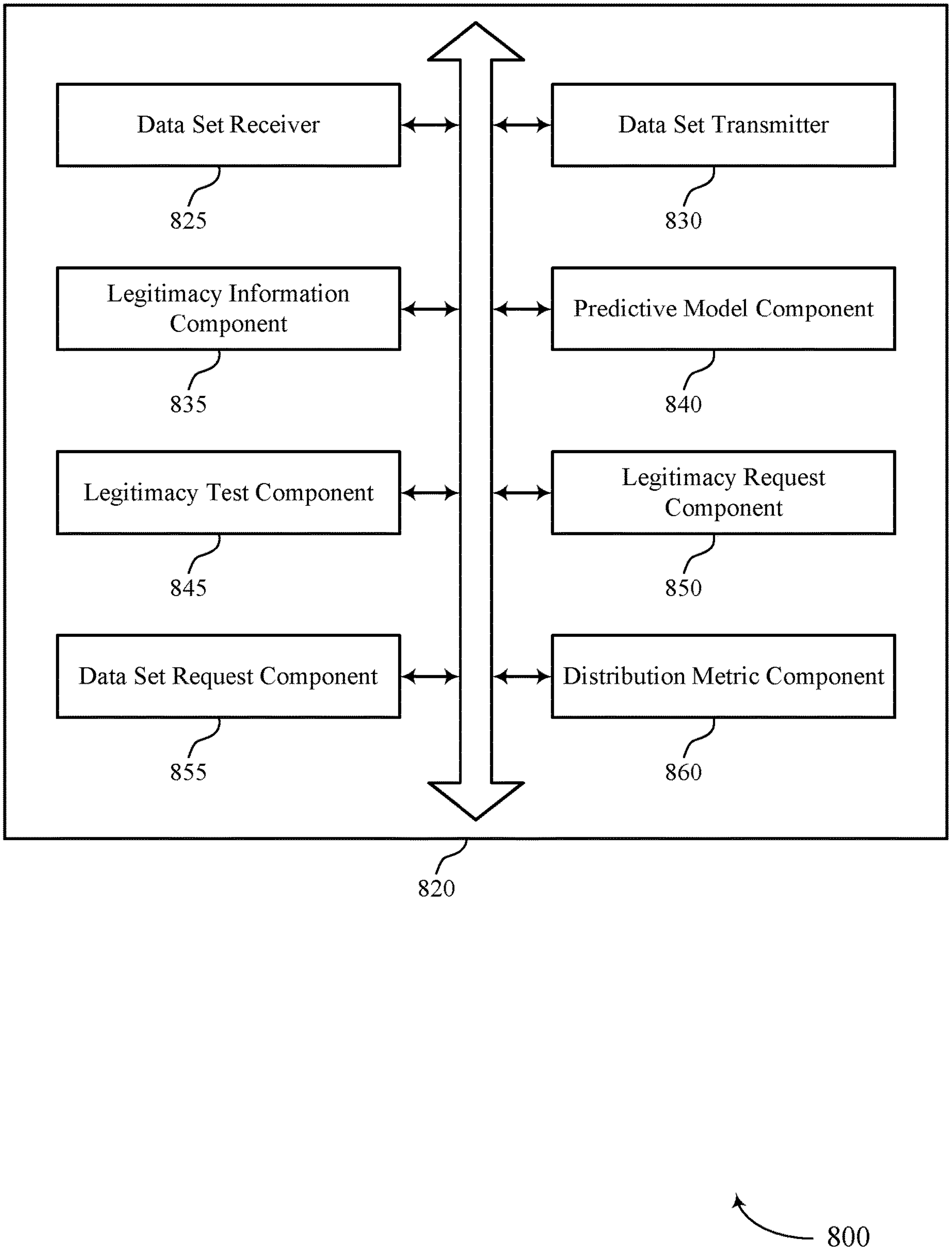
FIG. 8 shows a block diagram of a communications manager that supports schemes for identifying corrupted datasets for machine learning security in accordance with one or more aspects of the present disclosure.

FIG. 8 shows a block diagram 800 of a communications manager 820 that supports schemes for identifying corrupted datasets for machine learning security in accordance with one or more aspects of the present disclosure. The communications manager 820 may be an example of aspects of a communications manager 620, a communications manager 720, or both, as described herein. The communications manager 820, or various components thereof, may be an example of means for performing various aspects of schemes for identifying corrupted datasets for machine learning security as described herein. For example, the communications manager 820 may include a dataset receiver 825, a dataset transmitter 830, a legitimacy information component 835, a predictive model component 840, a legitimacy test component 845, a legitimacy request component 850, a dataset request component 855, a distribution metric component 860, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 820 may support wireless communications at a first network entity in accordance with examples as disclosed herein. The dataset receiver 825 may be configured as or otherwise support a means for receiving a first dataset for a predictive model, the first dataset corresponding to one or more measurements associated with a UE. The dataset transmitter 830 may be configured as or otherwise support a means for transmitting, to a second network entity, the first dataset for a legitimacy test of the first dataset, the legitimacy test to determine a validity of the first dataset based on at least one second dataset. The legitimacy information component 835 may be configured as or otherwise support a means for receiving, from the second network entity, a message including information associated with a result of the legitimacy test of the first dataset. The predictive model component 840 may be configured as or otherwise support a means for updating the predictive model using one or more datasets based on the information, where the one or more datasets include the first dataset or exclude the first dataset based on the result of the legitimacy test.

In some examples, to support receiving the message, the legitimacy information component 835 may be configured as or otherwise support a means for receiving, as part of the message, an indication that the first dataset is to be included in the one or more datasets based on a success result of the legitimacy test of the first dataset, where the success result of the legitimacy test corresponds to the validity of the first dataset being valid.

In some examples, to support receiving the message, the legitimacy information component 835 may be configured as or otherwise support a means for receiving, as part of the message, an indication that the first dataset is to be excluded from the one or more datasets based on a failure result of the legitimacy test of the first dataset, where the failure result of the legitimacy test corresponds to the validity of the first dataset being corrupt.

In some examples, to support receiving the message, the legitimacy information component 835 may be configured as or otherwise support a means for receiving, as part of the message, one or more performance metrics associated with the first dataset based on the legitimacy test. In some examples, the one or more performance metrics include a performance relation metric associated with the first dataset and the at least one second dataset, a performance difference associated with the first dataset and the at least one second dataset, or a combination thereof. In some examples, the one or more performance metrics are associated with a negative impact on an output of the legitimacy test.

In some examples, to support receiving the message, the legitimacy information component 835 may be configured as or otherwise support a means for receiving, as part of the message, an indication that the result of the legitimacy test is based on a performance metric associated with the second predictive model using the first dataset and the at least one second dataset.

In some examples, the message further indicates that the second predictive model is trained on the at least one second dataset and indicates that the first dataset is used as test data for the second predictive model. In some examples, the at least one second dataset includes a trusted dataset.

In some examples, the message further indicates that the first dataset is used as an input dataset to train the second predictive model and indicates that the at least one second dataset is used as test data for the second predictive model. In some examples, the at least one second dataset includes a trusted dataset.

In some examples, the message further indicates that the second predictive model is trained on a first set of datasets and indicates that a second set of datasets is used as test data for the second predictive model. In some examples, the first set of datasets, the second set of datasets, or both includes the first dataset.

In some examples, the legitimacy request component 850 may be configured as or otherwise support a means for transmitting, to the second network entity, a second message indicating a request for the second network entity to perform the legitimacy test of the first dataset, where receiving the message is based on the request.

In some examples, the dataset request component 855 may be configured as or otherwise support a means for transmitting a second message indicating a request for datasets associated with one or more performance metrics that satisfy a performance threshold. In some examples, the dataset receiver 825 may be configured as or otherwise support a means for receiving a third message including a dataset based on the request. In some examples, the predictive model component 840 may be configured as or otherwise support a means for updating the predictive model using the dataset.

Additionally, or alternatively, the communications manager 820 may support wireless communications at a second network entity in accordance with examples as disclosed herein. In some examples, the dataset receiver 825 may be configured as or otherwise support a means for receiving, from a first network entity, a first dataset for a predictive model at the first network entity, the first dataset corresponding to one or more measurements associated with a UE. The legitimacy test component 845 may be configured as or otherwise support a means for performing a legitimacy test of the first dataset based on the first dataset and at least one second dataset, the legitimacy test to determine a validity of the first dataset. In some examples, the legitimacy information component 835 may be configured as or otherwise support a means for transmitting, to the first network entity, a message including information associated with a result of the legitimacy test of the first dataset.

In some examples, to support performing the legitimacy test, the legitimacy test component 845 may be configured as or otherwise support a means for comparing a first output of the second predictive model associated with the first dataset against a second output of the second predictive model associated with the second dataset to obtain a performance metric, where the result of the legitimacy test is based on the performance metric.

In some examples, a success result of the legitimacy test corresponds to the validity of the first dataset being valid based on the performance metric satisfying a performance threshold. In some examples, a failure result of the legitimacy test corresponds to the validity of the first dataset being corrupt based on the performance metric failing to satisfy the performance threshold.

In some examples, the dataset request component 855 may be configured as or otherwise support a means for receiving a second message indicating a request for datasets associated with one or more performance metrics that satisfy a performance threshold. In some examples, the dataset request component 855 may be configured as or otherwise support a means for determining that the performance metric satisfies the performance threshold. In some examples, the dataset transmitter 830 may be configured as or otherwise support a means for transmitting a third message including the first dataset based on the request.

In some examples, the distribution metric component 860 may be configured as or otherwise support a means for determining a distribution metric associated with the first dataset and the at least one second dataset, where comparing the first output against the second output is based on the distribution metric satisfying a similarity threshold.

In some examples, to support transmitting the message, the legitimacy information component 835 may be configured as or otherwise support a means for transmitting, as part of the message, an indication that the first dataset is to be included in one or more datasets for the predictive model based on a success result of the legitimacy test of the first dataset.

In some examples, to support transmitting the message, the legitimacy information component 835 may be configured as or otherwise support a means for transmitting, as part of the message, an indication that the first dataset is to be excluded from one or more datasets for the predictive model based on a failure result of the legitimacy test of the first dataset.

In some examples, to support transmitting the message, the legitimacy information component 835 may be configured as or otherwise support a means for transmitting, as part of the message, one or more performance metrics associated with the first dataset based on the legitimacy test. In some examples, the one or more performance metrics include a performance relation metric associated with the first dataset and the at least one second dataset, a performance difference associated with the first dataset and the at least one second dataset, or a combination thereof. In some examples, the one or more performance metrics are associated with a negative impact on an output of the legitimacy test.

In some examples, to support transmitting the message, the legitimacy information component 835 may be configured as or otherwise support a means for transmitting, as part of the message, an indication that the result of the legitimacy test is based on a performance metric associated with the second predictive model using the first dataset and the at least one second dataset.

In some examples, to support performing the legitimacy test, the legitimacy test component 845 may be configured as or otherwise support a means for providing the at least one second dataset as training inputs for the second predictive model to obtain a first output. In some examples, to support performing the legitimacy test, the legitimacy test component 845 may be configured as or otherwise support a means for providing the first dataset as testing inputs for the second predictive model to obtain a second output. In some examples, to support performing the legitimacy test, the legitimacy test component 845 may be configured as or otherwise support a means for comparing the first output with the second output to obtain the performance metric, where the message further indicates that the second predictive model is trained on the at least one second dataset and indicates that the first dataset is used as test data for the second predictive model. In some examples, the at least one second dataset includes a trusted dataset.

In some examples, to support performing the legitimacy test, the legitimacy test component 845 may be configured as or otherwise support a means for providing the first dataset as training inputs for the second predictive model to obtain a first output. In some examples, to support performing the legitimacy test, the legitimacy test component 845 may be configured as or otherwise support a means for providing the at least one second dataset as testing inputs for the second predictive model to obtain a second output. In some examples, to support performing the legitimacy test, the legitimacy test component 845 may be configured as or otherwise support a means for comparing the first output with the second output to obtain the performance metric, where the message further indicates that the second predictive model is trained on the first dataset and indicates that the at least one second dataset is used as test data for the second predictive model. In some examples, the at least one second dataset includes a trusted dataset.

In some examples, to support performing the legitimacy test, the legitimacy test component 845 may be configured as or otherwise support a means for providing a first set of datasets as training inputs for the second predictive model to obtain a first output. In some examples, to support performing the legitimacy test, the legitimacy test component 845 may be configured as or otherwise support a means for providing a second set of datasets as testing inputs for the second predictive model to obtain a second output. In some examples, to support performing the legitimacy test, the legitimacy test component 845 may be configured as or otherwise support a means for comparing the first output with the second output to obtain the performance metric, where the message further indicates that the second predictive model is trained on the first set of datasets and indicates that the second set of datasets is used as test data for the second predictive model. In some examples, the first set of datasets, the second set of datasets, or both includes the first dataset.

In some examples, the dataset receiver 825 may be configured as or otherwise support a means for receiving a second message indicating a third dataset. In some examples, the legitimacy test component 845 may be configured as or otherwise support a means for performing a legitimacy test of the third dataset based on the third dataset and the at least one second dataset, where the message further includes information associated with a result of the legitimacy test of the third dataset.

In some examples, the legitimacy request component 850 may be configured as or otherwise support a means for receiving, from the first network entity, a second message indicating a request for the second network entity to perform the legitimacy test of the first dataset, where transmitting the message is based on the request.

Additionally, or alternatively, the communications manager 820 may support wireless communications at a network entity in accordance with examples as disclosed herein. In some examples, the legitimacy test component 845 may be configured as or otherwise support a means for receiving, from a core network node, a message indicating one or more parameters for a legitimacy test for datasets associated with a predictive model. In some examples, the dataset receiver 825 may be configured as or otherwise support a means for receiving a first dataset for the predictive model, the first dataset corresponding to one or more measurements associated with a UE. In some examples, the legitimacy test component 845 may be configured as or otherwise support a means for performing the legitimacy test of the first dataset based on the first dataset and at least one second dataset and in accordance with the one or more parameters the legitimacy test to determine a validity of the first dataset. In some examples, the predictive model component 840 may be configured as or otherwise support a means for updating the predictive model using one or more datasets, where the one or more datasets include the first dataset or exclude the first dataset based on a result of the legitimacy test.

In some examples, to support receiving the message, the legitimacy request component 850 may be configured as or otherwise support a means for receiving, as part of the message, a request for the network entity to perform the legitimacy test for the first dataset. In some examples, to support receiving the message, the legitimacy information component 835 may be configured as or otherwise support a means for transmitting a second message indicating the result of the legitimacy test of the first dataset based on the request. In some examples, the one or more parameters include one or more distribution metrics associated with statistical properties of the first dataset and the at least one second dataset, one or more similarity thresholds corresponding to the one or more distribution metrics, or a combination thereof.

In some examples, the distribution metric component 860 may be configured as or otherwise support a means for determining a distribution metric of the one or more distribution metrics for the first dataset and the at least one second dataset, where performing the legitimacy test is based on the distribution metric satisfying a similarity threshold of the one or more similarity thresholds.

In some examples, the distribution metric component 860 may be configured as or otherwise support a means for determining a distribution metric of the one or more distribution metrics for the first dataset and the at least one second dataset. In some examples, the distribution metric component 860 may be configured as or otherwise support a means for refraining from performing the legitimacy test based on the distribution metric failing to satisfy a similarity threshold of the one or more similarity thresholds.

In some examples, to support performing the legitimacy test, the legitimacy test component 845 may be configured as or otherwise support a means for comparing a first output of the second predictive model associated with the first dataset against a second output of the second predictive model associated with the second dataset to obtain a performance metric, where the result of the legitimacy test is based on the performance metric.

In some examples, a success result of the legitimacy test corresponds to the validity of the first dataset being valid based on the performance metric satisfying a performance threshold. In some examples, a failure result of the legitimacy test corresponds to the validity of the first dataset being corrupt based on the performance metric failing to satisfy the performance threshold.

In some examples, the dataset request component 855 may be configured as or otherwise support a means for receiving a second message indicating a request for datasets associated with one or more performance metrics that satisfy a performance threshold. In some examples, the dataset request component 855 may be configured as or otherwise support a means for determining that the performance metric satisfies the performance threshold. In some examples, the dataset transmitter 830 may be configured as or otherwise support a means for transmitting a third message including the first dataset based on the request. In some examples, the performance metric includes a performance relation metric associated with the first dataset and the at least one second dataset, a performance difference associated with the first dataset and the at least one second dataset, or a combination thereof.

In some examples, to support performing the legitimacy test, the legitimacy test component 845 may be configured as or otherwise support a means for providing the at least one second dataset as training inputs for the second predictive model to obtain a first output. In some examples, to support performing the legitimacy test, the legitimacy test component 845 may be configured as or otherwise support a means for providing the first dataset as testing inputs for the second predictive model to obtain a second output. In some examples, to support performing the legitimacy test, the legitimacy test component 845 may be configured as or otherwise support a means for comparing the first output with the second output to obtain a performance metric, where the result of the legitimacy test is based on the performance metric.

In some examples, to support performing the legitimacy test, the legitimacy test component 845 may be configured as or otherwise support a means for providing the first dataset as training inputs for the second predictive model to obtain a first output. In some examples, to support performing the legitimacy test, the legitimacy test component 845 may be configured as or otherwise support a means for providing the at least one second dataset as testing inputs for the second predictive model to obtain a second output. In some examples, to support performing the legitimacy test, the legitimacy test component 845 may be configured as or otherwise support a means for comparing the first output with the second output to obtain a performance metric, where the result of the legitimacy test is based on the performance metric.

In some examples, to support performing the legitimacy test, the legitimacy test component 845 may be configured as or otherwise support a means for providing a first set of datasets as training inputs for the second predictive model to obtain a first output. In some examples, to support performing the legitimacy test, the legitimacy test component 845 may be configured as or otherwise support a means for providing a second set of datasets as testing inputs for the second predictive model to obtain a second output. In some examples, to support performing the legitimacy test, the legitimacy test component 845 may be configured as or otherwise support a means for comparing the first output with the second output to obtain a performance metric, where the result of the legitimacy test is based on the performance metric. In some examples, the first set of datasets, the second set of datasets, or both includes the first dataset.

In some examples, to support updating the predictive model, the predictive model component 840 may be configured as or otherwise support a means for updating the predictive model using the one or more datasets including the first dataset based on a successful result of the legitimacy test of the first dataset.

In some examples, to support updating the predictive model, the predictive model component 840 may be configured as or otherwise support a means for updating the predictive model using the one or more datasets excluding the first dataset based on a failure result of the legitimacy test of the first dataset. In some examples, the at least one second dataset includes a trusted dataset.

In some examples, the dataset receiver 825 may be configured as or otherwise support a means for receiving a second message including a third set of data and an indication of a successful result of a legitimacy test for the third set of data. In some examples, the predictive model component 840 may be configured as or otherwise support a means for updating the predictive model using the one or more datasets including the third dataset based on the second message.

Additionally, or alternatively, the communications manager 820 may support wireless communications at a core network node in accordance with examples as disclosed herein. In some examples, the legitimacy test component 845 may be configured as or otherwise support a means for configuring one or more parameters of a legitimacy test for datasets associated with a predictive model, the legitimacy test to determine a validity of a dataset. In some examples, the legitimacy test component 845 may be configured as or otherwise support a means for transmitting, to a set of network entities, a message indicating the one or more parameters for the legitimacy test.

In some examples, a success result of the legitimacy test corresponds to a validity of the dataset being valid. In some examples, a failure result of the legitimacy test corresponds to a validity of the dataset being corrupt.

In some examples, the legitimacy request component 850 may be configured as or otherwise support a means for transmitting, to the set of network entities, a second message indicating a request to perform the legitimacy test on one or more datasets associated with the set of network entities in accordance with the one or more parameters.

In some examples, the legitimacy information component 835 may be configured as or otherwise support a means for receiving, from the set of network entities, a set of messages indicating a result of the legitimacy test on one or more datasets associated with the set of network entities based on the one or more parameters. In some examples, the one or more parameters include one or more distribution metrics associated with statistical properties of a first dataset and a second dataset, one or more similarity thresholds corresponding to the one or more distribution metrics, or a combination thereof.

Figure 9:
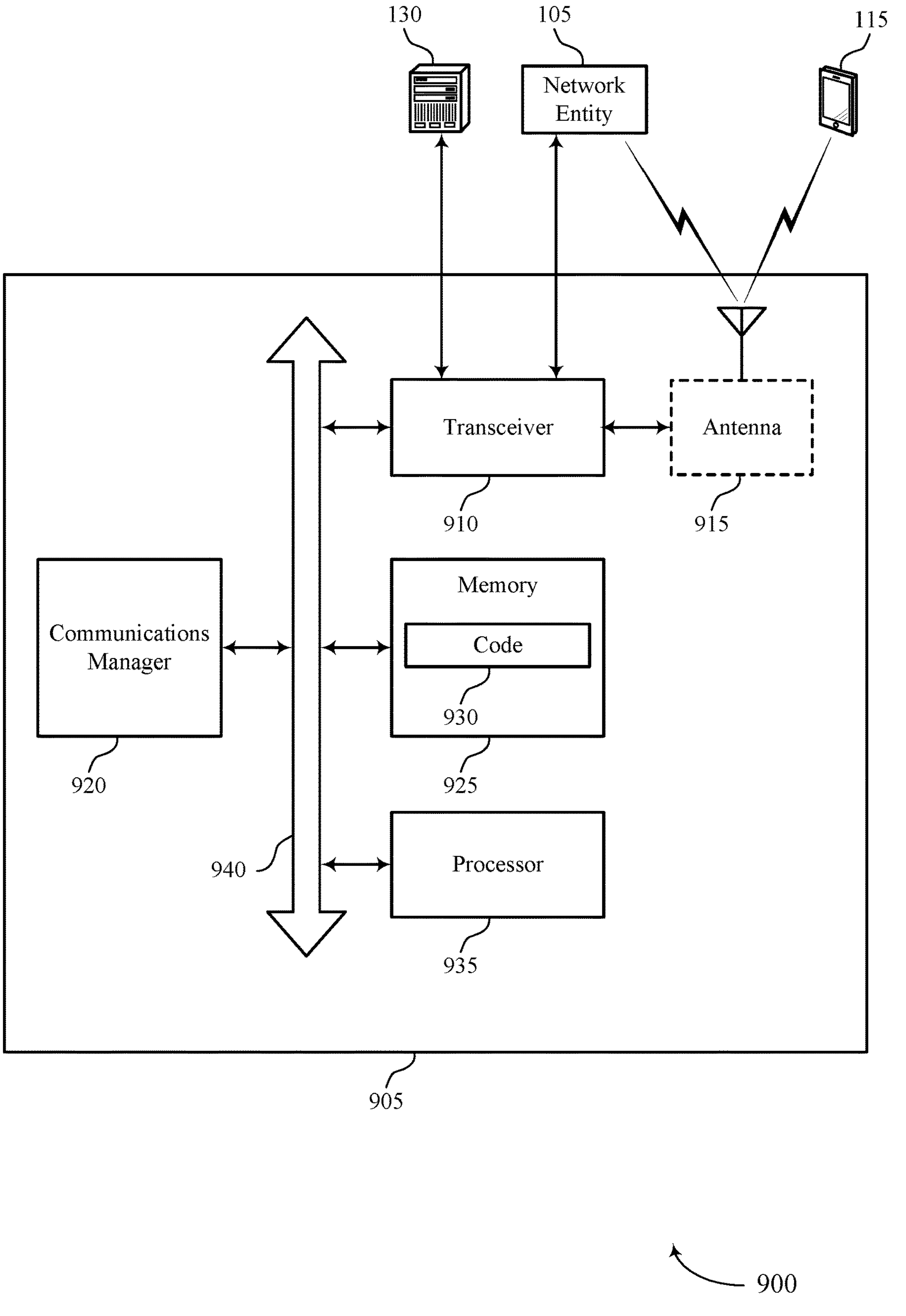
FIG. 9 shows a diagram of a system including a device that supports schemes for identifying corrupted datasets for machine learning security in accordance with one or more aspects of the present disclosure.

FIG. 9 shows a diagram of a system 900 including a device 905 that supports schemes for identifying corrupted datasets for machine learning security in accordance with one or more aspects of the present disclosure. The device 905 may be an example of or include the components of a device 605, a device 705, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, a memory 925, code 930, and a processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or memory components (for example, the processor 935, or the memory 925, or both), may be included in a chip or chip assembly that is installed in the device 905. In some examples, the transceiver may be operable to support communications via one or more communications links (e.g., a communication link 125, a backhaul communication link 120, a midhaul communication link 162, a fronthaul communication link 168).

The memory 925 may include RAM and ROM. The memory 925 may store computer-readable, computer-executable code 930 including instructions that, when executed by the processor 935, cause the device 905 to perform various functions described herein. The code 930 may be stored in a non-transitory computer-readable medium such as system memory or another type of memory. In some cases, the code 930 may not be directly executable by the processor 935 but may cause a computer (e.g., when compiled and executed) to perform functions described herein. In some cases, the memory 925 may contain, among other things, a BIOS which may control basic hardware or software operation such as the interaction with peripheral components or devices.

The processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 935 may be configured to operate a memory array using a memory controller. In some other cases, a memory controller may be integrated into the processor 935. The processor 935 may be configured to execute computer-readable instructions stored in a memory (e.g., the memory 925) to cause the device 905 to perform various functions (e.g., functions or tasks supporting schemes for identifying corrupted datasets for machine learning security). For example, the device 905 or a component of the device 905 may include a processor 935 and memory 925 coupled with the processor 935, the processor 935 and memory 925 configured to perform various functions described herein. The processor 935 may be an example of a cloud-computing platform (e.g., one or more physical nodes and supporting software such as operating systems, virtual machines, or container instances) that may host the functions (e.g., by executing code 930) to perform the functions of the device 905. The processor 935 may be any one or more suitable processors capable of executing scripts or instructions of one or more software programs stored in the device 905 (such as within the memory 925). In some implementations, the processor 935 may be a component of a processing system. A processing system may generally refer to a system or series of machines or components that receives inputs and processes the inputs to produce a set of outputs (which may be passed to other systems or components of, for example, the device 905). For example, a processing system of the device 905 may refer to a system including the various other components or subcomponents of the device 905, such as the processor 935, or the transceiver 910, or the communications manager 920, or other components or combinations of components of the device 905. The processing system of the device 905 may interface with other components of the device 905, and may process information received from other components (such as inputs or signals) or output information to other components. For example, a chip or modem of the device 905 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 905 may transmit information output from the chip or modem. Additionally, or alternatively, in some implementations, the one or more interfaces may refer to an interface between the processing system of the chip or modem and a receiver, such that the device 905 may obtain information or signal inputs, and the information may be passed to the processing system. A person having ordinary skill in the art will readily recognize that a first interface also may obtain information or signal inputs, and a second interface also may output information or signal outputs.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the memory 925, the code 930, and the processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communications at a first network entity in accordance with examples as disclosed herein. For example, the communications manager 920 may be configured as or otherwise support a means for receiving a first dataset for a predictive model, the first dataset corresponding to one or more measurements associated with a UE. The communications manager 920 may be configured as or otherwise support a means for transmitting, to a second network entity, the first dataset for a legitimacy test of the first dataset, the legitimacy test to determine a validity of the first dataset based on at least one second dataset. The communications manager 920 may be configured as or otherwise support a means for receiving, from the second network entity, a message including information associated with a result of the legitimacy test of the first dataset. The communications manager 920 may be configured as or otherwise support a means for updating the predictive model using one or more datasets based on the information, where the one or more datasets include the first dataset or exclude the first dataset based on the result of the legitimacy test.

Additionally, or alternatively, the communications manager 920 may support wireless communications at a second network entity in accordance with examples as disclosed herein. For example, the communications manager 920 may be configured as or otherwise support a means for receiving, from a first network entity, a first dataset for a predictive model at the first network entity, the first dataset corresponding to one or more measurements associated with a UE. The communications manager 920 may be configured as or otherwise support a means for performing a legitimacy test of the first dataset based on the first dataset and at least one second dataset, the legitimacy test to determine a validity of the first dataset. The communications manager 920 may be configured as or otherwise support a means for transmitting, to the first network entity, a message including information associated with a result of the legitimacy test of the first dataset.

Additionally, or alternatively, the communications manager 920 may support wireless communications at a network entity in accordance with examples as disclosed herein. For example, the communications manager 920 may be configured as or otherwise support a means for receiving, from a core network node, a message indicating one or more parameters for a legitimacy test for datasets associated with a predictive model. The communications manager 920 may be configured as or otherwise support a means for receiving a first dataset for the predictive model, the first dataset corresponding to one or more measurements associated with a UE. The communications manager 920 may be configured as or otherwise support a means for performing the legitimacy test of the first dataset based on the first dataset and at least one second dataset and in accordance with the one or more parameters the legitimacy test to determine a validity of the first dataset. The communications manager 920 may be configured as or otherwise support a means for updating the predictive model using one or more datasets, where the one or more datasets include the first dataset or exclude the first dataset based on a result of the legitimacy test.

Additionally, or alternatively, the communications manager 920 may support wireless communications at a core network node in accordance with examples as disclosed herein. For example, the communications manager 920 may be configured as or otherwise support a means for configuring one or more parameters of a legitimacy test for datasets associated with a predictive model, the legitimacy test to determine a validity of a dataset. The communications manager 920 may be configured as or otherwise support a means for transmitting, to a set of network entities, a message indicating the one or more parameters for the legitimacy test.

By including or configuring the communications manager 920 in accordance with examples as described herein, the device 905 may support techniques for improved security and robustness in machine learning models. For example, the device 905 may coordinate with other devices to perform legitimacy testing for candidate datasets and to exchange legitimacy information related to the candidate datasets. Thus, the device 905 may reject or avoid corrupt or invalid datasets, thereby improving accuracy and security of a predictive model. Additionally, the device 905 may request valid datasets from other devices for the predictive model, which may improve reliability of the predictive model and reduce processing at the device 905. Moreover, the device 905 may train the predictive model using received valid datasets with improved diversity, which may increase robustness of the predictive model.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, the processor 935, the memory 925, the code 930, or any combination thereof. For example, the code 930 may include instructions executable by the processor 935 to cause the device 905 to perform various aspects of schemes for identifying corrupted datasets for machine learning security as described herein, or the processor 935 and the memory 925 may be otherwise configured to perform or support such operations.

Figure 10:
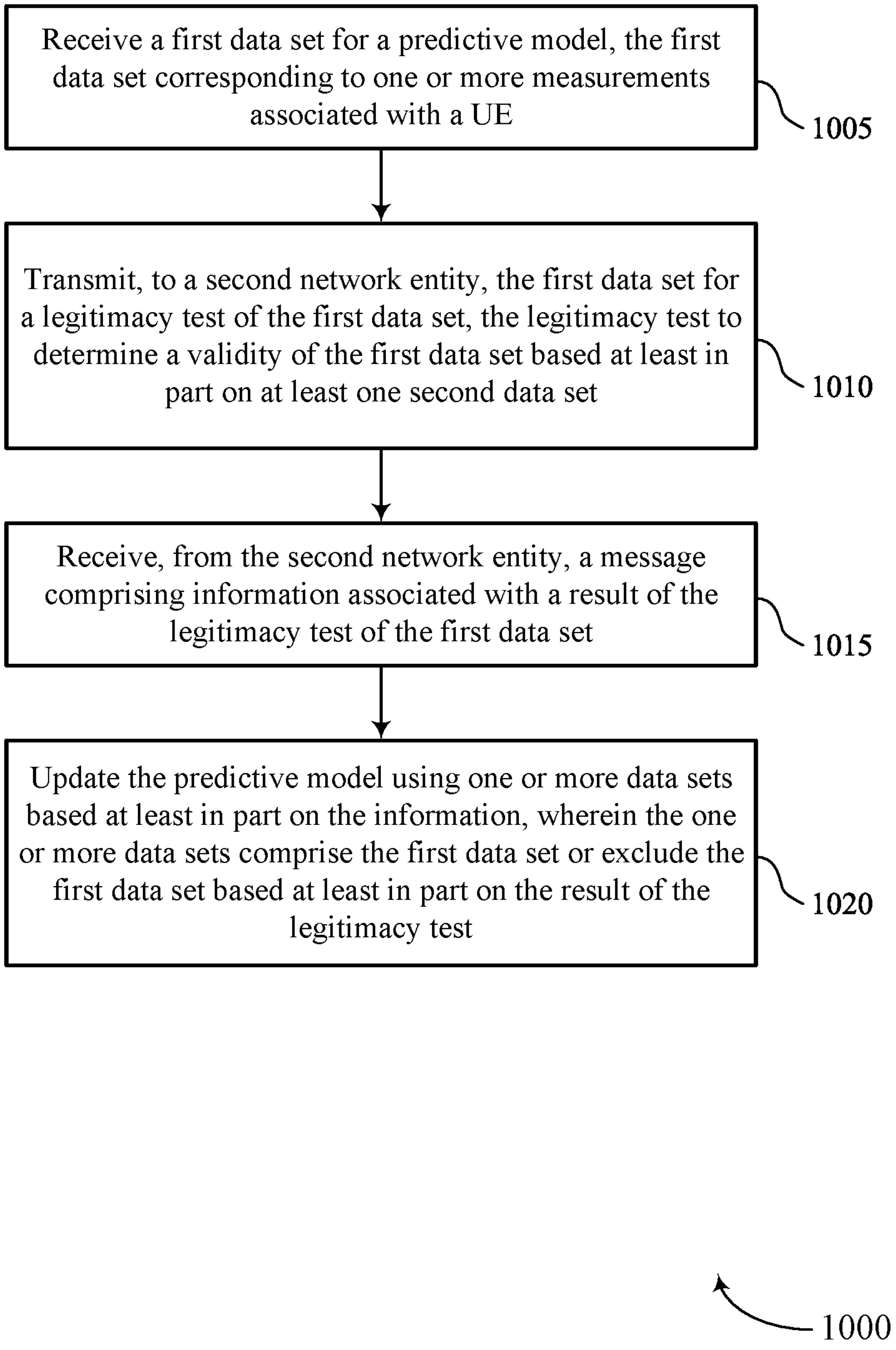
FIGS. 10 through 13 show flowcharts illustrating methods that support schemes for identifying corrupted datasets for machine learning security in accordance with one or more aspects of the present disclosure.

FIG. 10 shows a flowchart illustrating a method 1000 that supports schemes for identifying corrupted datasets for machine learning security in accordance with one or more aspects of the present disclosure. The operations of the method 1000 may be implemented by a network entity or its components as described herein. For example, the operations of the method 1000 may be performed by a network entity or a core network node as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1005, the method may include receiving a first dataset for a predictive model, the first dataset corresponding to one or more measurements associated with a UE. The operations of 1005 may be performed in accordance with examples as disclosed herein. In some examples, aspects of the operations of 1005 may be performed by a dataset receiver 825 as described with reference to FIG. 8.

At 1010, the method may include transmitting, to a second network entity, the first dataset for a legitimacy test of the first dataset, the legitimacy test to determine a validity of the first dataset based on at least one second dataset. The operations of 1010 may be performed in accordance with examples as disclosed herein. In some examples, aspects of the operations of 1010 may be performed by a dataset transmitter 830 as described with reference to FIG. 8.

At 1015, the method may include receiving, from the second network entity, a message including information associated with a result of the legitimacy test of the first dataset. The operations of 1015 may be performed in accordance with examples as disclosed herein. In some examples, aspects of the operations of 1015 may be performed by a legitimacy information component 835 as described with reference to FIG. 8.

At 1020, the method may include updating the predictive model using one or more datasets based on the information, where the one or more datasets include the first dataset or exclude the first dataset based on the result of the legitimacy test. The operations of 1020 may be performed in accordance with examples as disclosed herein. In some examples, aspects of the operations of 1020 may be performed by a predictive model component 840 as described with reference to FIG. 8.

Figure 11:
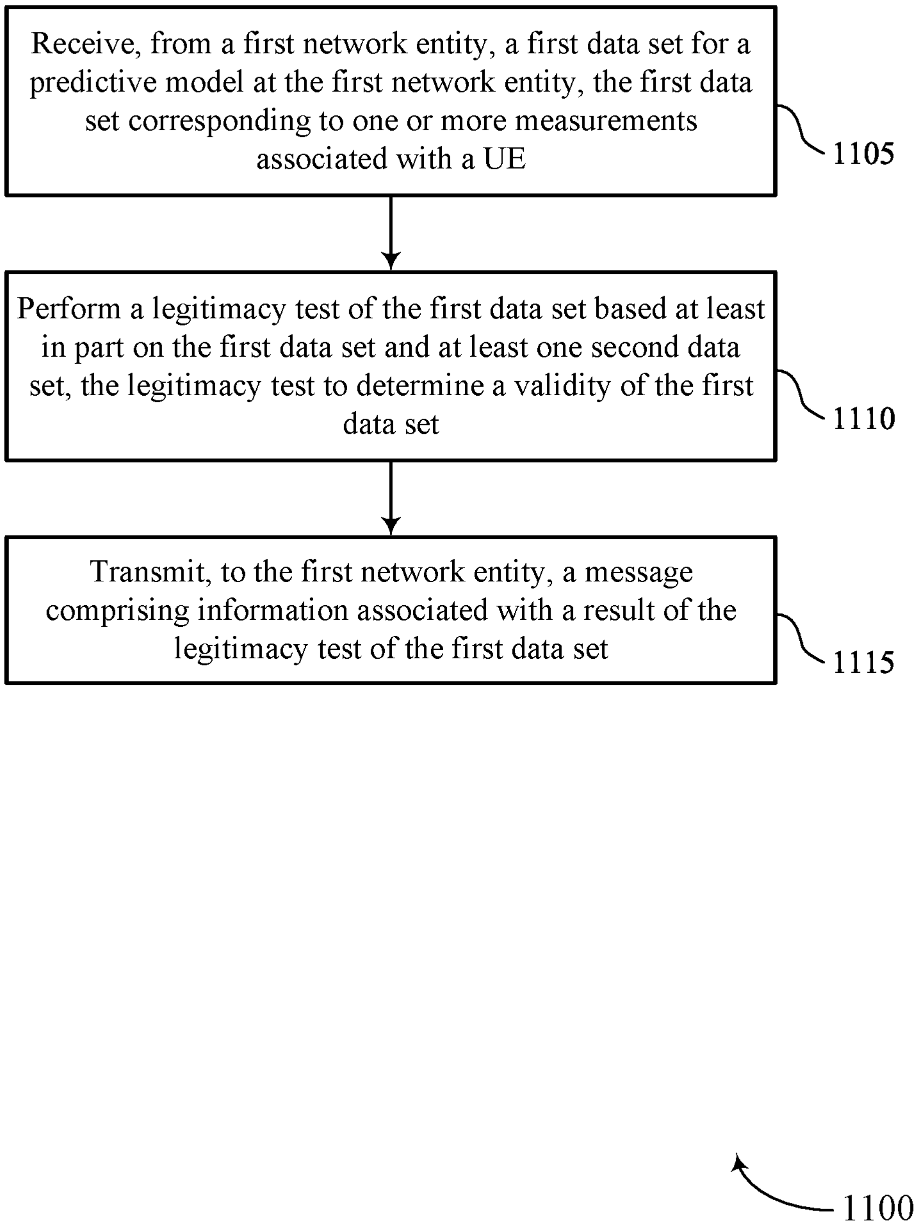

FIG. 11 shows a flowchart illustrating a method 1100 that supports schemes for identifying corrupted datasets for machine learning security in accordance with one or more aspects of the present disclosure. The operations of the method 1100 may be implemented by a network entity or its components as described herein. For example, the operations of the method 1100 may be performed by a network entity or a core network node as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1105, the method may include receiving, from a first network entity, a first dataset for a predictive model at the first network entity, the first dataset corresponding to one or more measurements associated with a UE. The operations of 1105 may be performed in accordance with examples as disclosed herein. In some examples, aspects of the operations of 1105 may be performed by a dataset receiver 825 as described with reference to FIG. 8.

At 1110, the method may include performing a legitimacy test of the first dataset based on the first dataset and at least one second dataset, the legitimacy test to determine a validity of the first dataset. The operations of 1110 may be performed in accordance with examples as disclosed herein. In some examples, aspects of the operations of 1110 may be performed by a legitimacy test component 845 as described with reference to FIG. 8.

At 1115, the method may include transmitting, to the first network entity, a message including information associated with a result of the legitimacy test of the first dataset. The operations of 1115 may be performed in accordance with examples as disclosed herein. In some examples, aspects of the operations of 1115 may be performed by a legitimacy information component 835 as described with reference to FIG. 8.

Figure 12:
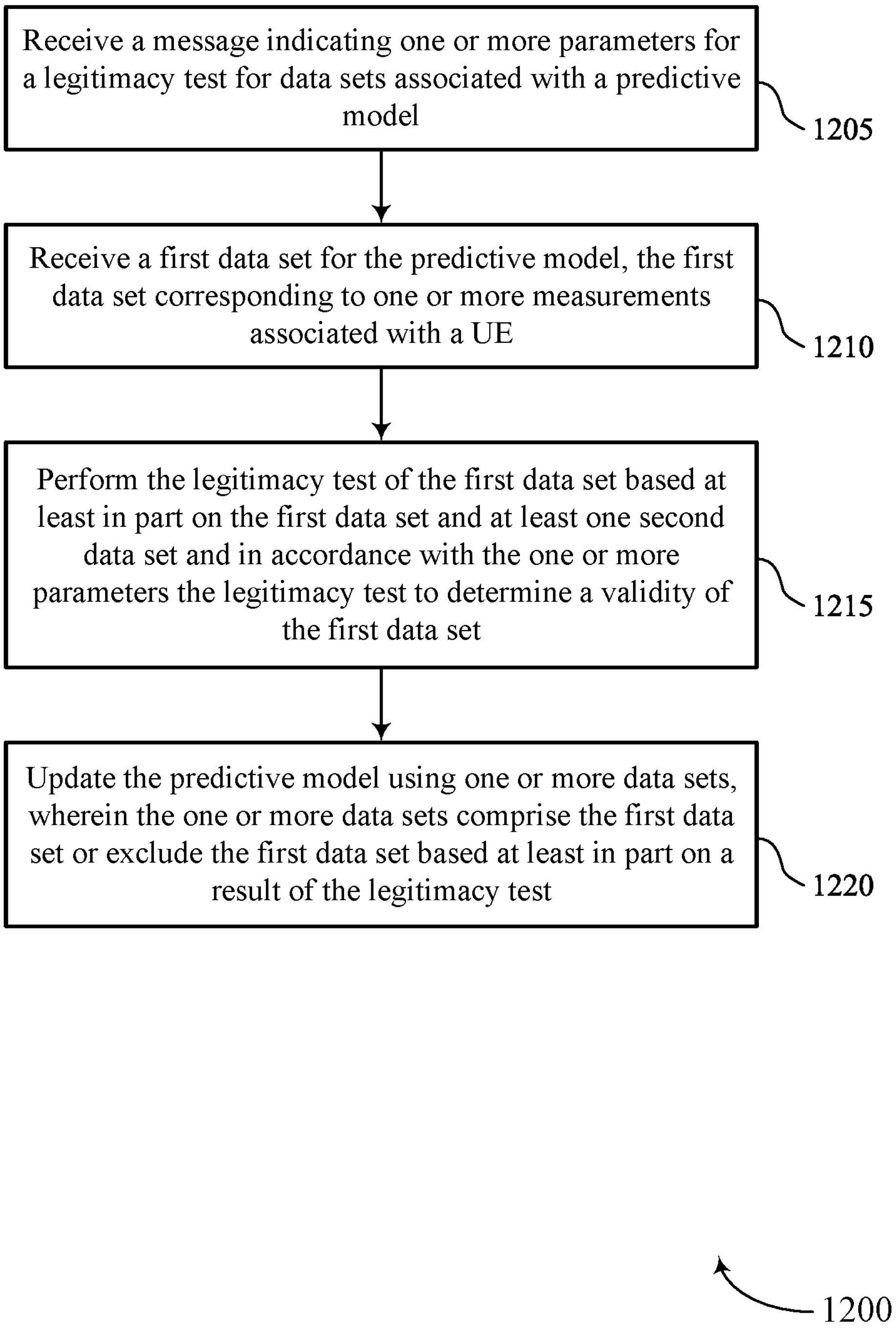

FIG. 12 shows a flowchart illustrating a method 1200 that supports schemes for identifying corrupted datasets for machine learning security in accordance with one or more aspects of the present disclosure. The operations of the method 1200 may be implemented by a network entity or its components as described herein. For example, the operations of the method 1200 may be performed by a network entity or a core network node as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1205, the method may include receiving a message indicating one or more parameters for a legitimacy test for datasets associated with a predictive model. The operations of 1205 may be performed in accordance with examples as disclosed herein. In some examples, aspects of the operations of 1205 may be performed by a legitimacy test component 845 as described with reference to FIG. 8.

At 1210, the method may include receiving, from a core network node, a first dataset for the predictive model, the first dataset corresponding to one or more measurements associated with a UE. The operations of 1210 may be performed in accordance with examples as disclosed herein. In some examples, aspects of the operations of 1210 may be performed by a dataset receiver 825 as described with reference to FIG. 8.

At 1215, the method may include performing the legitimacy test of the first dataset based on the first dataset and at least one second dataset and in accordance with the one or more parameters, the legitimacy test to determine a validity of the first dataset. The operations of 1215 may be performed in accordance with examples as disclosed herein. In some examples, aspects of the operations of 1215 may be performed by a legitimacy test component 845 as described with reference to FIG. 8.

At 1220, the method may include updating the predictive model using one or more datasets, where the one or more datasets include the first dataset or exclude the first dataset based on a result of the legitimacy test. The operations of 1220 may be performed in accordance with examples as disclosed herein. In some examples, aspects of the operations of 1220 may be performed by a predictive model component 840 as described with reference to FIG. 8.

Figure 13:
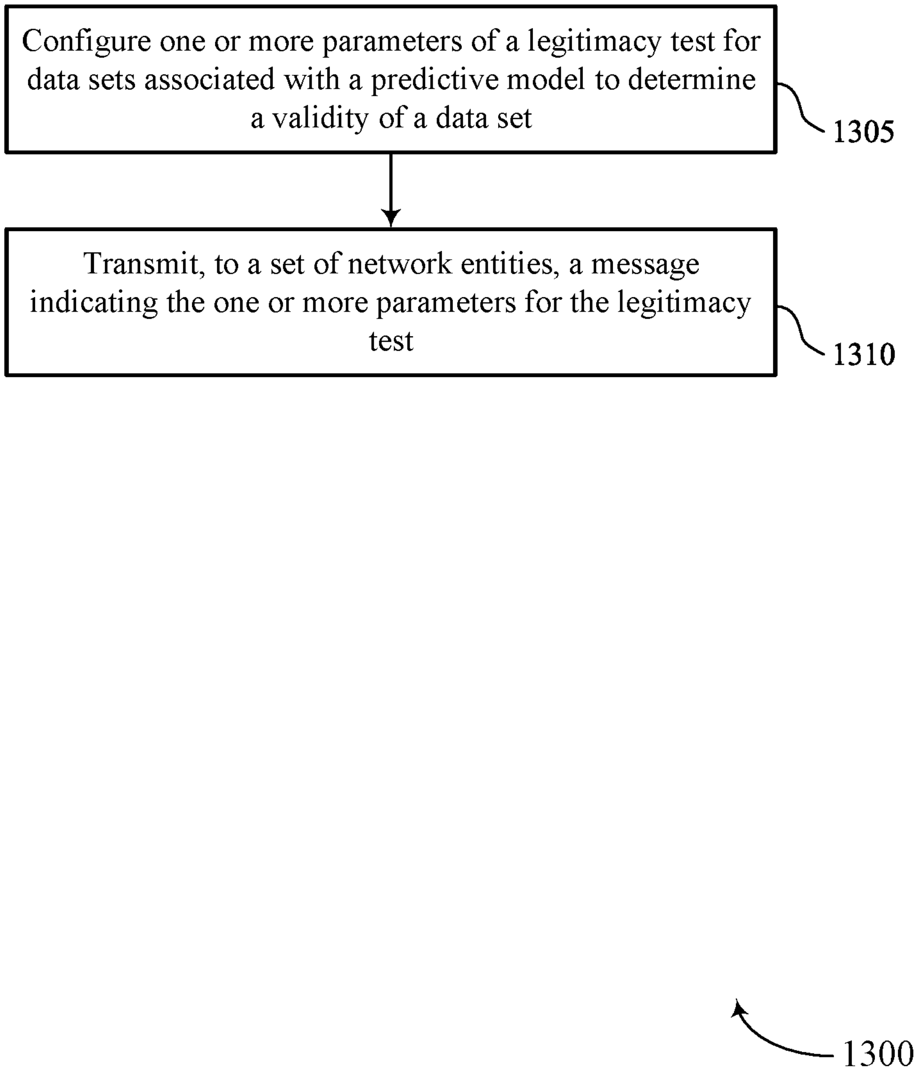

FIG. 13 shows a flowchart illustrating a method 1300 that supports schemes for identifying corrupted datasets for machine learning security in accordance with one or more aspects of the present disclosure. The operations of the method 1300 may be implemented by a network entity or its components as described herein. For example, the operations of the method 1300 may be performed by a network entity or a core network node as described with reference to FIGS. 1 through 9. In some examples, a network entity may execute a set of instructions to control the functional elements of the network entity to perform the described functions. Additionally, or alternatively, the network entity may perform aspects of the described functions using special-purpose hardware.

At 1305, the method may include configuring one or more parameters of a legitimacy test for datasets associated with a predictive model, the legitimacy test to determine a validity of a dataset. The operations of 1305 may be performed in accordance with examples as disclosed herein. In some examples, aspects of the operations of 1305 may be performed by a legitimacy test component 845 as described with reference to FIG. 8.

At 1310, the method may include transmitting, to a set of network entities, a message indicating the one or more parameters for the legitimacy test. The operations of 1310 may be performed in accordance with examples as disclosed herein. In some examples, aspects of the operations of 1310 may be performed by a legitimacy test component 845 as described with reference to FIG. 8.

The following provides an overview of aspects of the present disclosure:

Aspect 1: A method for wireless communications at a first network entity, comprising: receiving a first dataset for a predictive model, the first dataset corresponding to one or more measurements associated with a UE; transmitting, to a second network entity, the first dataset for a legitimacy test of the first dataset, the legitimacy test to determine a validity of the first dataset based at least in part on at least one second dataset; receiving, from the second network entity, a message comprising information associated with a result of the legitimacy test of the first dataset; and updating the predictive model using one or more datasets based at least in part on the information, wherein the one or more datasets comprise the first dataset or exclude the first dataset based at least in part on the result of the legitimacy test.

Aspect 2: The method of aspect 1, wherein receiving the message comprises: receiving, as part of the message, an indication that the first dataset is to be included in the one or more datasets based at least in part on a success result of the legitimacy test of the first dataset, wherein the success result of the legitimacy test corresponds to the validity of the first dataset being valid.

Aspect 3: The method of aspect 1, wherein receiving the message comprises: receiving, as part of the message, an indication that the first dataset is to be excluded from the one or more datasets based at least in part on a failure result of the legitimacy test of the first dataset, wherein the failure result of the legitimacy test corresponds to the validity of the first dataset being corrupt.

Aspect 4: The method of any of aspects 1 through 3, wherein receiving the message comprises: receiving, as part of the message, one or more performance metrics associated with the first dataset based at least in part on the legitimacy test.

Aspect 5: The method of aspect 4, wherein the one or more performance metrics comprise a performance relation metric associated with the first dataset and the at least one second dataset, a performance difference associated with the first dataset and the at least one second dataset, or a combination thereof.

Aspect 6: The method of any of aspects 4 through 5, wherein the one or more performance metrics are associated with a negative impact on an output of the legitimacy test.

Aspect 7: The method of any of aspects 1 through 6, wherein the legitimacy test comprises a second predictive model, and wherein receiving the message comprises: receiving, as part of the message, an indication that the result of the legitimacy test is based at least in part on a performance metric associated with the second predictive model using the first dataset and the at least one second dataset.

Aspect 8: The method of aspect 7, wherein the message further indicates that the second predictive model is trained on the at least one second dataset and indicates that the first dataset is used as test data for the second predictive model.

Aspect 9: The method of aspect 8, wherein the at least one second dataset comprises a trusted dataset.

Aspect 10: The method of aspect 7, wherein the message further indicates that the first dataset is used as an input dataset to train the second predictive model and indicates that the at least one second dataset is used as test data for the second predictive model.

Aspect 11: The method of aspect 10, wherein the at least one second dataset comprises a trusted dataset.

Aspect 12: The method of aspect 7, wherein the message further indicates that the second predictive model is trained on a first set of datasets and indicates that a second set of datasets is used as test data for the second predictive model.

Aspect 13: The method of aspect 12, wherein the first set of datasets, the second set of datasets, or both includes the first dataset.

Aspect 14: The method of any of aspects 1 through 13, further comprising: transmitting, to the second network entity, a second message indicating a request for the second network entity to perform the legitimacy test of the first dataset, wherein receiving the message is based at least in part on the request.

Aspect 15: The method of any of aspects 1 through 14, further comprising: transmitting a second message indicating a request for datasets associated with one or more performance metrics that satisfy a performance threshold; receiving a third message comprising a dataset based at least in part on the request; and updating the predictive model using the dataset.

Aspect 16: A method for wireless communications at a second network entity, comprising: receiving, from a first network entity, a first dataset for a predictive model at the first network entity, the first dataset corresponding to one or more measurements associated with a UE; performing a legitimacy test of the first dataset based at least in part on the first dataset and at least one second dataset, the legitimacy test to determine a validity of the first dataset; and transmitting, to the first network entity, a message comprising information associated with a result of the legitimacy test of the first dataset.

Aspect 17: The method of aspect 16, wherein the legitimacy test comprises a second predictive model, and wherein performing the legitimacy test comprises: comparing a first output of the second predictive model associated with the first dataset against a second output of the second predictive model associated with the second dataset to obtain a performance metric, wherein the result of the legitimacy test is based at least in part on the performance metric.

Aspect 18: The method of aspect 17, wherein a success result of the legitimacy test corresponds to the validity of the first dataset being valid based at least in part on the performance metric satisfying a performance threshold, and a failure result of the legitimacy test corresponds to the validity of the first dataset being corrupt based at least in part on the performance metric failing to satisfy the performance threshold.

Aspect 19: The method of any of aspects 17 through 18, further comprising: receiving a second message indicating a request for datasets associated with one or more performance metrics that satisfy a performance threshold; determining that the performance metric satisfies the performance threshold; and transmitting a third message comprising the first dataset based at least in part on the request.

Aspect 20: The method of any of aspects 17 through 19, further comprising: determining a distribution metric associated with the first dataset and the at least one second dataset, wherein comparing the first output against the second output is based at least in part on the distribution metric satisfying a similarity threshold.

Aspect 21: The method of any of aspects 16 through 20, wherein transmitting the message comprises: transmitting, as part of the message, an indication that the first dataset is to be included in one or more datasets for the predictive model based at least in part on a success result of the legitimacy test of the first dataset.

Aspect 22: The method of any of aspects 16 through 20, wherein transmitting the message comprises: transmitting, as part of the message, an indication that the first dataset is to be excluded from one or more datasets for the predictive model based at least in part on a failure result of the legitimacy test of the first dataset.

Aspect 23: The method of any of aspects 16 through 22, wherein transmitting the message comprises: transmitting, as part of the message, one or more performance metrics associated with the first dataset based at least in part on the legitimacy test.

Aspect 24: The method of aspect 23, wherein the one or more performance metrics comprise a performance relation metric associated with the first dataset and the at least one second dataset, a performance difference associated with the first dataset and the at least one second dataset, or a combination thereof.

Aspect 25: The method of any of aspects 23 through 24, wherein the one or more performance metrics are associated with a negative impact on an output of the legitimacy test.

Aspect 26: The method of any of aspects 16 through 25, wherein the legitimacy test comprises a second predictive model, and wherein transmitting the message comprises: transmitting, as part of the message, an indication that the result of the legitimacy test is based at least in part on a performance metric associated with the second predictive model using the first dataset and the at least one second dataset.

Aspect 27: The method of aspect 26, wherein performing the legitimacy test comprises: providing the at least one second dataset as training inputs for the second predictive model to obtain a first output; providing the first dataset as testing inputs for the second predictive model to obtain a second output; and comparing the first output with the second output to obtain the performance metric, wherein the message further indicates that the second predictive model is trained on the at least one second dataset and indicates that the first dataset is used as test data for the second predictive model.

Aspect 28: The method of aspect 27, wherein the at least one second dataset comprises a trusted dataset.

Aspect 29: The method of aspect 26, wherein performing the legitimacy test comprises: providing the first dataset as training inputs for the second predictive model to obtain a first output; providing the at least one second dataset as testing inputs for the second predictive model to obtain a second output; and comparing the first output with the second output to obtain the performance metric, wherein the message further indicates that the second predictive model is trained on the first dataset and indicates that the at least one second dataset is used as test data for the second predictive model.

Aspect 30: The method of aspect 29, wherein the at least one second dataset comprises a trusted dataset.

Aspect 31: The method of any of aspect 26, wherein performing the legitimacy test comprises: providing a first set of datasets as training inputs for the second predictive model to obtain a first output; providing a second set of datasets as testing inputs for the second predictive model to obtain a second output; and comparing the first output with the second output to obtain the performance metric, wherein the message further indicates that the second predictive model is trained on the first set of datasets and indicates that the second set of datasets is used as test data for the second predictive model.

Aspect 32: The method of aspect 31, wherein the first set of datasets, the second set of datasets, or both includes the first dataset.

Aspect 33: The method of any of aspects 16 through 32, further comprising: receiving a second message indicating a third dataset; and performing a legitimacy test of the third dataset based at least in part on the third dataset and the at least one second dataset, wherein the message further comprises information associated with a result of the legitimacy test of the third dataset.

Aspect 34: The method of any of aspects 16 through 33, further comprising: receiving, from the first network entity, a second message indicating a request for the second network entity to perform the legitimacy test of the first dataset, wherein transmitting the message is based at least in part on the request.

Aspect 35: A method for wireless communications at a network entity, comprising: receiving, from a core network node, a message indicating one or more parameters for a legitimacy test for datasets associated with a predictive model; receiving a first dataset for the predictive model, the first dataset corresponding to one or more measurements associated with a UE; performing the legitimacy test of the first dataset based at least in part on the first dataset and at least one second dataset and in accordance with the one or more parameters the legitimacy test to determine a validity of the first dataset; and updating the predictive model using one or more datasets, wherein the one or more datasets comprise the first dataset or exclude the first dataset based at least in part on a result of the legitimacy test.

Aspect 36: The method of aspect 35, wherein receiving the message comprises: receiving, as part of the message, a request for the network entity to perform the legitimacy test for the first dataset; and transmitting a second message indicating the result of the legitimacy test of the first dataset based at least in part on the request.

Aspect 37: The method of any of aspects 35 through 36, wherein the one or more parameters comprise one or more distribution metrics associated with statistical properties of the first dataset and the at least one second dataset, one or more similarity thresholds corresponding to the one or more distribution metrics, or a combination thereof.

Aspect 38: The method of aspect 37, further comprising: determining a distribution metric of the one or more distribution metrics for the first dataset and the at least one second dataset, wherein performing the legitimacy test is based at least in part on the distribution metric satisfying a similarity threshold of the one or more similarity thresholds.

Aspect 39: The method of any of aspects 37 through 38, further comprising: determining a distribution metric of the one or more distribution metrics for the first dataset and the at least one second dataset; and refraining from performing the legitimacy test based at least in part on the distribution metric failing to satisfy a similarity threshold of the one or more similarity thresholds.

Aspect 40: The method of any of aspects 35 through 39, wherein the legitimacy test comprises a second predictive model, and wherein performing the legitimacy test comprises: comparing a first output of the second predictive model associated with the first dataset against a second output of the second predictive model associated with the second dataset to obtain a performance metric, wherein the result of the legitimacy test is based at least in part on the performance metric.

Aspect 41: The method of aspect 40, wherein a success result of the legitimacy test corresponds to the validity of the first dataset being valid based at least in part on the performance metric satisfying a performance threshold, and a failure result of the legitimacy test corresponds to the validity of the first dataset being corrupt based at least in part on the performance metric failing to satisfy the performance threshold.

Aspect 42: The method of any of aspects 40 through 41, further comprising: receiving a second message indicating a request for datasets associated with one or more performance metrics that satisfy a performance threshold; determining that the performance metric satisfies the performance threshold; and transmitting a third message comprising the first dataset based at least in part on the request.

Aspect 43: The method of any of aspects 40 through 42, wherein the performance metric comprises a performance relation metric associated with the first dataset and the at least one second dataset, a performance difference associated with the first dataset and the at least one second dataset, or a combination thereof.

Aspect 44: The method of any of aspects 35 through 43, wherein the legitimacy test comprises a second predictive model, and wherein performing the legitimacy test comprises: providing the at least one second dataset as training inputs for the second predictive model to obtain a first output; providing the first dataset as testing inputs for the second predictive model to obtain a second output; and comparing the first output with the second output to obtain a performance metric, wherein the result of the legitimacy test is based at least in part on the performance metric.

Aspect 45: The method of any of aspects 35 through 43, wherein the legitimacy test comprises a second predictive model, and wherein performing the legitimacy test comprises: providing the first dataset as training inputs for the second predictive model to obtain a first output; providing the at least one second dataset as testing inputs for the second predictive model to obtain a second output; and comparing the first output with the second output to obtain a performance metric, wherein the result of the legitimacy test is based at least in part on the performance metric.

Aspect 46: The method of any of aspects 35 through 43, wherein the legitimacy test comprises a second predictive model, and wherein performing the legitimacy test comprises: providing a first set of datasets as training inputs for the second predictive model to obtain a first output; providing a second set of datasets as testing inputs for the second predictive model to obtain a second output; and comparing the first output with the second output to obtain a performance metric, wherein the result of the legitimacy test is based at least in part on the performance metric.

Aspect 47: The method of aspect 46, wherein the first set of datasets, the second set of datasets, or both includes the first dataset.

Aspect 48: The method of any of aspects 35 through 47, wherein updating the predictive model comprises: updating the predictive model using the one or more datasets comprising the first dataset based at least in part on a successful result of the legitimacy test of the first dataset.

Aspect 49: The method of any of aspects 35 through 47, wherein updating the predictive model comprises: updating the predictive model using the one or more datasets excluding the first dataset based at least in part on a failure result of the legitimacy test of the first dataset.

Aspect 50: The method of any of aspects 35 through 49, wherein the at least one second dataset comprises a trusted dataset.

Aspect 51: The method of any of aspects 35 through 50, further comprising: receiving a second message comprising a third set of data and an indication of a successful result of a legitimacy test for the third set of data; and updating the predictive model using the one or more datasets including the third dataset based at least in part on the second message.

Aspect 52: A method for wireless communications at a core network node, comprising: configuring one or more parameters of a legitimacy test for datasets associated with a predictive model, the legitimacy test to determine a validity of a dataset; and transmitting, to a set of network entities, a message indicating the one or more parameters for the legitimacy test.

Aspect 53: The method of aspect 52, wherein a success result of the legitimacy test corresponds to a validity of the dataset being valid, and a failure result of the legitimacy test corresponds to a validity of the dataset being corrupt.

Aspect 54: The method of any of aspects 52 through 53, further comprising: transmitting, to the set of network entities, a second message indicating a request to perform the legitimacy test on one or more datasets associated with the set of network entities in accordance with the one or more parameters.

Aspect 55: The method of any of aspects 52 through 54, further comprising: receiving, from the set of network entities, a set of messages indicating a result of the legitimacy test on one or more datasets associated with the set of network entities based at least in part on the one or more parameters.

Aspect 56: The method of any of aspects 52 through 55, wherein the one or more parameters comprise one or more distribution metrics associated with statistical properties of a first dataset and a second dataset, one or more similarity thresholds corresponding to the one or more distribution metrics, or a combination thereof.

Aspect 57: An apparatus for wireless communications at a first network entity, comprising a processor; memory coupled with the processor; and instructions stored in the memory and executable by the processor to cause the apparatus to perform a method of any of aspects 1 through 15.

Aspect 58: An apparatus for wireless communications at a first network entity, comprising at least one means for performing a method of any of aspects 1 through 15.

Aspect 59: A non-transitory computer-readable medium storing code for wireless communications at a first network entity, the code comprising instructions executable by a processor to perform a method of any of aspects 1 through 15.

Aspect 60: An apparatus for wireless communications at a second network entity, comprising a processor; memory coupled with the processor; and instructions stored in the memory and executable by the processor to cause the apparatus to perform a method of any of aspects 16 through 34.

Aspect 61: An apparatus for wireless communications at a second network entity, comprising at least one means for performing a method of any of aspects 16 through 34.

Aspect 62: A non-transitory computer-readable medium storing code for wireless communications at a second network entity, the code comprising instructions executable by a processor to perform a method of any of aspects 16 through 34.

Aspect 63: An apparatus for wireless communications at a network entity, comprising a processor; memory coupled with the processor; and instructions stored in the memory and executable by the processor to cause the apparatus to perform a method of any of aspects 35 through 51.

Aspect 64: An apparatus for wireless communications at a network entity, comprising at least one means for performing a method of any of aspects 35 through 51.

Aspect 65: A non-transitory computer-readable medium storing code for wireless communications at a network entity, the code comprising instructions executable by a processor to perform a method of any of aspects 35 through 51.

Aspect 66: An apparatus for wireless communications at a core network node, comprising a processor; memory coupled with the processor; and instructions stored in the memory and executable by the processor to cause the apparatus to perform a method of any of aspects 52 through 56.

Aspect 67: An apparatus for wireless communications at a core network node, comprising at least one means for performing a method of any of aspects 52 through 56.

Aspect 68: A non-transitory computer-readable medium storing code for wireless communications at a core network node, the code comprising instructions executable by a processor to perform a method of any of aspects 52 through 56.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first network entity, comprising:
- at least one processor;
- at least one memory coupled with the at least one processor; and
- instructions stored in the at least one memory and executable by the at least one processor to cause the apparatus to:
  - receive a first dataset for a predictive model, the first dataset corresponding to one or more measurements associated with a user equipment (UE);
  - transmit, to a second network entity, the first dataset for a legitimacy test of the first dataset, the legitimacy test to determine a validity of the first dataset based at least in part on at least one second dataset;
  - receive, from the second network entity, a message comprising information associated with a result of the legitimacy test of the first dataset; and
  - update the predictive model using one or more datasets based at least in part on the information, wherein the one or more datasets comprise the first dataset based at least in part on the result of the legitimacy test indicating sufficient performance of a second predictive model using the first dataset as compared to an output of the second predictive model using the at least one second dataset or exclude the first dataset based at least in part on the result of the legitimacy test indicating a degradation in performance of the second predictive model using the first dataset as compared to the output of the second predictive model using the at least one second dataset.

2. The apparatus of claim 1, wherein the instructions to receive the message are executable by the at least one processor to cause the apparatus to:
- receive, as part of the message, an indication that the first dataset is to be included in the one or more datasets based at least in part on a success result of the legitimacy test of the first dataset, wherein the success result of the legitimacy test corresponds to the validity of the first dataset being valid.

3. The apparatus of claim 1, wherein the instructions to receive the message are executable by the at least one processor to cause the apparatus to:
- receive, as part of the message, an indication that the first dataset is to be excluded from the one or more datasets based at least in part on a failure result of the legitimacy test of the first dataset, wherein the failure result of the legitimacy test corresponds to the validity of the first dataset being corrupt.

4. The apparatus of claim 1, wherein the instructions to receive the message are executable by the at least one processor to cause the apparatus to:
- receive, as part of the message, one or more performance metrics associated with the first dataset based at least in part on the legitimacy test, wherein the one or more performance metrics comprise a performance relation metric associated with the first dataset and the at least one second dataset, a performance difference associated with the first dataset and the at least one second dataset, or a combination thereof.

5. The apparatus of claim 1, wherein the instructions to receive the message are executable by the at least one processor to cause the apparatus to:
- receive, as part of the message, an indication that the result of the legitimacy test is based at least in part on a performance metric associated with the second predictive model using the first dataset and the at least one second dataset.

6. The apparatus of claim 5, wherein the message further indicates that the second predictive model is trained on the at least one second dataset and indicates that the first dataset is used as test data for the second predictive model, or indicates that the first dataset is used as an input dataset to train the second predictive model and indicates that the at least one second dataset is used as test data for the second predictive model.

7. The apparatus of claim 1, wherein the instructions are further executable by the at least one processor to cause the apparatus to:
- transmit, to the second network entity, a second message indicating a request for the second network entity to perform the legitimacy test of the first dataset, wherein receiving the message is based at least in part on the request.

8. The apparatus of claim 1, wherein the instructions are further executable by the at least one processor to cause the apparatus to:
- transmit a second message indicating a request for datasets associated with one or more performance metrics that satisfy a performance threshold;
- receive a third message comprising a dataset based at least in part on the request; and
- update the predictive model using the dataset.

9. A method for wireless communications at a first network entity, comprising:
- receiving a first dataset for a predictive model, the first dataset corresponding to one or more measurements associated with a user equipment (UE);
- transmitting, to a second network entity, the first dataset for a legitimacy test of the first dataset, the legitimacy test to determine a validity of the first dataset based at least in part on at least one second dataset;
- receiving, from the second network entity, a message comprising information associated with a result of the legitimacy test of the first dataset; and
- updating the predictive model using one or more datasets based at least in part on the information, wherein the one or more datasets comprise the first dataset based at least in part on the result of the legitimacy test indicating sufficient performance of a second predictive model using the first dataset as compared to an output of the second predictive model using the at least one second dataset or exclude the first dataset based at least in part on the result of the legitimacy test indicating a degradation in performance of the second predictive model using the first dataset as compared to the output of the second predictive model using the at least one second dataset.

10. The method of claim 9, wherein receiving the message further comprises:

receiving, as part of the message, an indication that the first dataset is to be included in the one or more datasets based at least in part on a success result of the legitimacy test of the first dataset, wherein the success result of the legitimacy test corresponds to the validity of the first dataset being valid.

11. The method of claim 9, wherein receiving the message further comprises:

receiving, as part of the message, an indication that the first dataset is to be excluded from the one or more datasets based at least in part on a failure result of the legitimacy test of the first dataset, wherein the failure result of the legitimacy test corresponds to the validity of the first dataset being corrupt.

12. The method of claim 9, wherein receiving the message further comprises:

receiving, as part of the message, one or more performance metrics associated with the first dataset based at least in part on the legitimacy test, wherein the one or more performance metrics comprise a performance relation metric associated with the first dataset and the at least one second dataset, a performance difference associated with the first dataset and the at least one second dataset, or a combination thereof.

13. The method of claim 9, wherein receiving the message further comprises:

receiving, as part of the message, an indication that the result of the legitimacy test is based at least in part on a performance metric associated with the second predictive model using the first dataset and the at least one second dataset.

14. The method of claim 13, wherein the message further indicates that the second predictive model is trained on the at least one second dataset and indicates that the first dataset is used as test data for the second predictive model, or indicates that the first dataset is used as an input dataset to train the second predictive model and indicates that the at least one second dataset is used as test data for the second predictive model.

15. The method of claim 9, further comprising:

transmitting, to the second network entity, a second message indicating a request for the second network entity to perform the legitimacy test of the first dataset, wherein receiving the message is based at least in part on the request.

16. The method of claim 9, further comprising:

transmitting a second message indicating a request for datasets associated with one or more performance metrics that satisfy a performance threshold;

receiving a third message comprising a dataset based at least in part on the request; and updating the predictive model using the dataset.

17. An apparatus for wireless communications at a first network entity, comprising:

means for receiving a first dataset for a predictive model, the first dataset corresponding to one or more measurements associated with a user equipment (UE);

means for transmitting, to a second network entity, the first dataset for a legitimacy test of the first dataset, the legitimacy test to determine a validity of the first dataset based at least in part on at least one second dataset;

means for receiving, from the second network entity, a message comprising information associated with a result of the legitimacy test of the first dataset; and means for updating the predictive model using one or more datasets based at least in part on the information, wherein the one or more datasets comprise the first dataset based at least in part on the result of the legitimacy test indicating sufficient performance of a second predictive model using the first dataset as compared to an output of the second predictive model using the at least one second dataset or exclude the first dataset based at least in part on the result of the legitimacy test indicating a degradation in performance of the second predictive model using the first dataset as compared to the output of the second predictive model using the at least one second dataset.

18. The apparatus of claim 17, wherein the means for receiving the message further comprises:

means for receiving, as part of the message, an indication that the first dataset is to be included in the one or more datasets based at least in part on a success result of the legitimacy test of the first dataset, wherein the success result of the legitimacy test corresponds to the validity of the first dataset being valid.

19. The apparatus of claim 17, wherein the means for receiving the message further comprises:

means for receiving, as part of the message, an indication that the first dataset is to be excluded from the one or more datasets based at least in part on a failure result of the legitimacy test of the first dataset, wherein the failure result of the legitimacy test corresponds to the validity of the first dataset being corrupt.

20. The apparatus of claim 17, wherein the means for receiving the message further comprises:

means for receiving, as part of the message, one or more performance metrics associated with the first dataset based at least in part on the legitimacy test, wherein the one or more performance metrics comprise a performance relation metric associated with the first dataset and the at least one second dataset, a performance difference associated with the first dataset and the at least one second dataset, or a combination thereof.

21. The apparatus of claim 17, wherein the means for receiving the message further comprises:

means for receiving, as part of the message, an indication that the result of the legitimacy test is based at least in part on a performance metric associated with the second predictive model using the first dataset and the at least one second dataset.

22. The apparatus of claim 21, wherein the message further indicates that the second predictive model is trained on the at least one second dataset and indicates that the first dataset is used as test data for the second predictive model, or indicates that the first dataset is used as an input dataset to train the second predictive model and indicates that the at least one second dataset is used as test data for the second predictive model.

23. The apparatus of claim 17, further comprising:

means for transmitting, to the second network entity, a second message indicating a request for the second network entity to perform the legitimacy test of the first dataset, wherein the message is received based at least in part on the request.

24. The apparatus of claim 17, further comprising:

means for transmitting a second message indicating a request for datasets associated with one or more performance metrics that satisfy a performance threshold;

means for receiving a third message comprising a dataset based at least in part on the request; and means for updating the predictive model using the dataset.

25. A non-transitory computer-readable medium storing code for wireless communications at a first network entity, the code comprising instructions executable by one or more processors to:

receive a first dataset for a predictive model, the first dataset corresponding to one or more measurements associated with a user equipment (UE);

transmit, to a second network entity, the first dataset for a legitimacy test of the first dataset, the legitimacy test to determine a validity of the first dataset based at least in part on at least one second dataset;

receive, from the second network entity, a message comprising information associated with a result of the legitimacy test of the first dataset; and update the predictive model using one or more datasets based at least in part on the information, wherein the one or more datasets comprise the first dataset based at least in part on the result of the legitimacy test indicating sufficient performance of a second predictive model using the first dataset as compared to an output of the second predictive model using the at least one second dataset or exclude the first dataset based at least in part on the result of the legitimacy test indicating a degradation in performance of the second predictive model using the first dataset as compared to the output of the second predictive model using the at least one second dataset.

26. The non-transitory computer-readable medium of claim 25, wherein the instructions to receive the message are further executable by the one or more processors to:

receive, as part of the message, an indication that the first dataset is to be included in the one or more datasets based at least in part on a success result of the legitimacy test of the first dataset, wherein the success result of the legitimacy test corresponds to the validity of the first dataset being valid.

27. The non-transitory computer-readable medium of claim 25, wherein the instructions to receive the message are further executable by the one or more processors to:

receive, as part of the message, an indication that the first dataset is to be excluded from the one or more datasets based at least in part on a failure result of the legitimacy test of the first dataset, wherein the failure result of the legitimacy test corresponds to the validity of the first dataset being corrupt.

28. The non-transitory computer-readable medium of claim 25, wherein the instructions to receive the message are further executable by the one or more processors to:

receive, as part of the message, one or more performance metrics associated with the first dataset based at least in part on the legitimacy test, wherein the one or more performance metrics comprise a performance relation metric associated with the first dataset and the at least one second dataset, a performance difference associated with the first dataset and the at least one second dataset, or a combination thereof.

29. The non-transitory computer-readable medium of claim 25, wherein the instructions to receive the message are further executable by the one or more processors to:

receive, as part of the message, an indication that the result of the legitimacy test is based at least in part on a performance metric associated with the second predictive model using the first dataset and the at least one second dataset.

30. The non-transitory computer-readable medium of claim 29, wherein the message further indicates that the second predictive model is trained on the at least one second dataset and indicates that the first dataset is used as test data for the second predictive model, or indicates that the first dataset is used as an input dataset to train the second predictive model and indicates that the at least one second dataset is used as test data for the second predictive model.

* * * * *